US012647299B2

(12) United States Patent
Mages et al.

(10) Patent No.: US 12,647,299 B2
(45) Date of Patent: Jun. 2, 2026

(54) TRANSMITTING MODULE AND METHOD FOR TRANSMITTING DIFFERENTIAL SIGNALS IN A SERIAL BUS SYSTEM

(71) Applicant: Robert Bosch GmbH, Stuttgart (DE)

(72) Inventors: Christian Mages, Stuttgart (DE);
Steffen Walker, Reutlingen (DE)

(73) Assignee: ROBERT BOSCH GBMH, Stuttgart
(DE)

( * ) Notice: Subject to any disclaimer, the term of this
patent is extended or adjusted under 35
U.S.C. 154(b) by 77 days.

(21) Appl. No.: 18/889,460

(22) Filed: Sep. 19, 2024

(65) Prior Publication Data

US 2025/0141712 A1     May 1, 2025

(30) Foreign Application Priority Data

Oct. 25, 2023     (DE) ..................... 10 2023 210 555.1

(51) Int. Cl.
*H04B 1/38* (2015.01)
*H04L 5/16* (2006.01)
*H04L 12/40* (2006.01)

(52) U.S. Cl.
CPC ............................... *H04L 12/4013* (2013.01)

(58) Field of Classification Search
CPC ........... H04L 12/4013; H04L 12/40169; H04L
12/40039; H04L 12/40032; H04L
25/0266; H04J 3/0658; G06F 21/554

USPC ........ 375/219, 220, 222, 295, 316, 257, 258
See application file for complete search history.

(56) References Cited

U.S. PATENT DOCUMENTS

| | | | | |
|---|---|---|---|---|
| 2020/0382340 A1* | 12/2020 | Muth | ................. | H04L 12/40039 |
| 2022/0239527 A1* | 7/2022 | Hartwich | ............ | H04L 12/4013 |
| 2022/0292036 A1* | 9/2022 | Mutter | .............. | H04L 12/40169 |
| 2022/0311638 A1* | 9/2022 | Walker | ................ | H04L 25/0266 |
| 2022/0376948 A1* | 11/2022 | Antonsson | ........ | H04L 12/40169 |
| 2023/0237206 A1* | 7/2023 | Weigand | ............... | G06F 21/554 726/34 |
| 2023/0353185 A1* | 11/2023 | Banerjee | ........... | H04L 12/40032 |
| 2024/0267255 A1* | 8/2024 | Mutter | .................. | H04J 3/0658 |

* cited by examiner

*Primary Examiner* — Phuong Phu
(74) *Attorney, Agent, or Firm* — NORTON ROSE
FULBRIGHT US LLP

(57) ABSTRACT

A transmitting module and a method for transmitting differential signals in a serial bus system. The transmitting module has a first to a fourth transmission stage connected in a full bridge, in which the first and fourth transmission stage are connected in series and the third and second transmission stages are connected in series, and a current limiting circuit for measuring and evaluating currents through a first and a second bleeder resistor which are connected to the full bridge. The first to fourth transmission stages generate differential bus signals for a bus in response to the two different values of a digital transmit signal such that the transmitting module generates, in its first operating mode, a first or second bus state on the bus and generates, in its second operating mode, a third or fourth bus state.

19 Claims, 8 Drawing Sheets

TRANSMITTING MODULE AND METHOD FOR TRANSMITTING DIFFERENTIAL SIGNALS IN A SERIAL BUS SYSTEM

CROSS REFERENCE

The present application claims the benefit under 35 U.S.C. § 119 of German Patent Application No. DE 10 2023 210 555.1 filed on Oct. 25, 2023, which is expressly incorporated herein by reference in its entirety.

FIELD

The present invention relates to a transmitting module and a method for transmitting differential signals in a serial bus system which are usable in particular for CAN XL.

BACKGROUND INFORMATION

Serial bus systems are used for message or data transfer in technical plants. For example, a serial bus system can enable communication between sensors and control units in a vehicle or in a technical production plant, etc. For the data transfer, there are different standards or data transfer protocols.

Particularly well known are a CAN bus system, an LVDS bus system (LVDS=Low Voltage Differential Signaling), an MSC bus system (MSC=Micro Second Channel), and a 10BASE-T1S Ethernet.

In a CAN bus system, messages are transferred using the CAN and/or CAN FD protocol, as described in the ISO-11898-1:2015 standard as CAN protocol specification with CAN FD. With CAN FD, the transfer on the bus is switched back and forth between a slow operating mode in a first communication phase (arbitration phase) and a fast operating mode in a second communication phase (data phase). With a CAN FD bus system, a data transfer rate of greater than 1 Mbit per second (1 Mbps) is possible in the second communication phase. CAN FD is used by most manufacturers e.g., with a 500 kbit/s arbitration bit rate and a 2 Mbit/s data bit rate in the vehicle.

To enable even higher data rates in the second communication phase, there are successor bus systems for CAN FD, such as CAN SIC and CAN XL. With CAN SIC according to the CiA601-4 standard, a data rate of about 5 to 8 Mbit/s can be achieved in the second communication phase. For CAN XL, a data rate of >10 Mbit/s is required in the second communication phase. The requirements for this are defined in the CiA610-3 standard of the CAN in Automation (CiA) organization. In addition to pure data transport via the CAN bus, CAN XL is also intended to support other functions, such as functional safety, data security and quality of service (QoS). These are elementary properties which are required in an autonomously driving vehicle.

In all CAN-based bus systems mentioned above, for a transmit signal TxD, a bus signal CAN_H and, ideally simultaneously, a bus signal CAN_L are separately driven onto a bus. At least in the first communication phase, in the bus signals CAN_H, CAN_L, one bus state is actively driven. The other bus state is not driven and arises due to a terminating resistor for bus lines or bus wires of the bus. As a result of the differently driven states, in a real bus system, the signal shapes of the bus signals CAN_H, CAN_L can deviate from the ideal signal shape.

The reasons for this lie in particular in the bus system design, such as stub lines, switching delays of the switching stages for bus signals CAN_H, CAN_L, etc. Such maladjustments of the two bus signals CAN_H, CAN_L can lead to errors in the evaluation of the bus signals received from the bus.

To transmit and receive the bus signals, transmitting/receiving devices, also referred to as CAN transceivers or CAN FD transceivers, etc., are usually used for the individual communication subscribers in a CAN bus system. The CAN transceivers or CAN FD transceivers must not exceed the limit values for operation in the vehicle with regard to conducted emission. In this regard, transceivers for CAN XL must comply with even stricter limit values, which are specified in the IEC62228-3 standard. Only in this way is operation of the bus system possible at the specified higher bit rates than with CAN FD and CAN SIC. Depending on the semiconductor technology available, compliance with these strict limit values is a major challenge.

Likewise for transceivers for CAN XL, the recessive (rec) and dominant (dom) states must be generated in the arbitration phase. In order to meet the emission requirements of the IEC62228-3 standard, the temporal variation of the common mode voltage of the bus lines for the signals CAN_H, CAN_L in the mentioned transmission states, namely recessive and dominant, must be kept within narrow limits, since this temporal variation is a major cause of electromagnetic emissions in differential systems. Differential signal components cause no or negligible emissions, because the electromagnetic fields cancel each other out, whereas in the case of common-mode signal components they add up.

To suppress the common mode signal variation generated by a non-ideal transceiver, a common mode choke is used at its output, the common mode choke being used in particular in a certification measurement to check compliance with the IEC62228-3 standard. The common mode choke is also called "CMC". The common mode choke has the task of allowing differential signals (DM=differential mode) to pass through as unaffected as possible and of suppressing common mode signals (CM=common mode) as completely as possible. However, in real operation, the common mode choke and other slightly asymmetrical components convert part of the differential signal into common mode signals (DCMR=differential-to-common-mode conversion). It is therefore also important to optimize as much as possible the spectral properties of the differential signal generated by the transceiver.

SUMMARY

It is an object of the present invention to provide a transmitting module and a method for transmitting differential signals in a serial bus system which solve the aforementioned problems. In particular, the transmitting module and the method for transmitting differential signals in a serial bus system should, in a high-performance and yet cost-effective manner, enable the compensation of disturbances that affect the emission behavior of the transmitting module.

The object may be achieved by a transmitting module for transmitting differential signals in a serial bus system having certain features of the present invention. According to an example embodiment of the present invention, the transmitting module has a first to a fourth transmission stage which are connected in a full bridge, in which the first and fourth transmission stages are connected in series and the third and second transmission stages are connected in series, and a current limiting circuit for measuring and evaluating currents through a first and a second bleeder resistor which are connected to the full bridge, wherein the first to fourth transmission stages are designed to generate differential bus signals for a bus of the bus system in response to the two different values of a digital transmit signal such that the transmitting module generates, in its first operating mode, a first or second bus state on the bus and generates, in its second operating mode, a third or fourth bus state, wherein the bus signals on the bus form a differential voltage of which the voltage value is different for the first to fourth bus states, and wherein the current limiting circuit is designed to limit the current through the second bleeder resistor on the basis of the evaluation of the currents by the current limiting circuit and according to a value of the digital transmit signal, the operating mode of the transmitting module, and the predefined limit value.

The described transmitting module of the present invention has a comparatively uncomplicated current limiting device which requires little area on a semiconductor chip and which has a simple design. This makes the described transmitting module very cost-effective to manufacture. Nevertheless, the described transmitting module can comply with the limit values required for the transmitting module very well and safely.

In particular, the required limit values for the emission of a transmitting/receiving device for CAN XL can be achieved with the described transmitting module. The transmitting module complies in particular with the CiA610-3 standard, which specifies a specific maximum transmission current for the transmitting module, namely a maximum of 115 mA. In particular, the circuit of the described transmitting module ensures that the elements of the full bridge limit the transmission current of the transmitting module to a maximum of 115 mA. In addition, the transmitting module can comply in particular with the IEC62228-3 standard, which specifies limit values to be complied with for the bus states dom, sic and rec.

The design of the described transmitting module of the present invention has, among other things, a very advantageous effect on the minimization of interference emission. The reason for this is that the transmitting module has greater resistor share and less semiconductor share (p-n junction, transistor) available for providing a corresponding internal resistance of the full bridge than a concept that uses transistors instead of the resistors of the transmitting module, which are arranged at the terminals to the voltage supply (CAN supply) and to ground (CAN_GND). In the case of the described transmitting module, this results in better matching of the voltage levels at the terminals for the bus. This leads to smaller common mode amplitudes and thus lower emission.

As a result, the interference emission of the full-bridge circuit of the described transmitting module of the present invention is further minimized in comparison with other transmitting modules having a full-bridge circuit. This is true especially when considering process variations and changes in the junction temperature $T_j$ of semiconductors of the other transmitting modules.

The described transmitting module of the present invention allows a temporally staggered and controlled switching process since the four transmission stages of the transmitting module are divided into n parts. Switching on according to the Gaussian error function is possible. This allows smooth behavior to be set during the switch-on process. In addition, the possible variation in time intervals during switch-on prevents the occurrence of a narrow-band frequency line in the emission frequency spectrum.

According to an example embodiment of the present invention, alternatively, it is possible to use the described transmitting module to carry out a staggered and controlled switching process by means of fixed time steps and varied voltage steps. This too allows the emission behavior of the transmitting module to be influenced in such a way that the specified limit values are complied with.

Advantageous further embodiments of the transmitting module are disclosed herein.

According to one exemplary embodiment of the present invention, the current limiting circuit is designed to control, in the first operating mode of the transmitting module, the first to fourth transmission stages to generate the third bus state if the evaluation of the currents through the first and/or second bleeder resistor shows that the value of at least one of the currents exceeds the predefined limit value.

According to one exemplary embodiment of the present invention, the current limiting circuit is designed to control, in the first operating mode of the transmitting module, the first to fourth transmission stages for modified generation of the first bus state if the evaluation of the currents through the first and/or second bleeder resistor shows that the value of at least one of the currents exceeds the predefined limit value.

According to one embodiment of the present invention, the first bus state is a dominant bus state and the second bus state is a recessive bus state which can be overwritten by the dominant bus state, wherein the current limiting circuit is designed such that each falling edge on the transmit signal activates the current limiting circuit, and wherein the current limiting circuit is designed such that, at each rising edge on the transmit signal, the current limiting circuit switches the transmitting module to a transmission state for generating the recessive bus state on the bus.

Optionally, according to an example embodiment of the present invention, the current limiting circuit comprises a filter having a filter time period, wherein the current limiting circuit is designed to control, in the first operating mode of the transmitting module, the first to fourth transmission stages for current limiting only after the filter time period has elapsed.

According to an example embodiment of the present invention, the current limiting circuit may comprise a first and a second comparator, wherein the first bleeder resistor is connected between a terminal for the bus voltage supply and the full bridge and is connected between inputs of the first comparator, and wherein the second bleeder resistor is connected between a terminal for ground and the full bridge and is connected between inputs of the second comparator.

The current limiting circuit may also comprise an operating mode control block designed to evaluate the outputs of the comparators.

According to at least one exemplary embodiment of the present invention, the current limiting circuit also comprises an adjustment module for adjusting the current limiting according to at least one piece of information and/or one parameter, wherein the at least one piece of information and/or parameter comprises: a hold time for which the third bus state switched due to current limiting is to be fixed, regardless of the output signal of the comparators; a current detection which, during the third bus state switched due to current limiting, indicates whether the current has fallen below the usual value for the third bus state; a detection of transient disturbances for which the current limiting circuit is not activated, regardless of the output signal of the comparators.

According to an example embodiment of the present invention, the current limiting circuit may be designed to generate a digital signal which indicates whether current limiting is active in which the first to fourth transmission stages are to be controlled, in the first operating mode of the transmitting module, to generate the third bus state, or is not active.

The output terminals of the full bridge can be intended for connection to a terminating resistor of the bus.

In a first communication phase of a frame that is generated for a message to at least one other subscriber station of the bus system, the transmitting module can be switched to the first operating mode, wherein, in a second communication phase of the frame, the transmitting module is switched to the second operating mode or a third operating mode, and wherein, in the first communication phase, it is negotiated between subscriber stations of the bus system which subscriber station will receive exclusive access to the bus of the bus system in the second communication phase following the first communication phase.

It is possible that the first transmission stage is designed to generate transmission currents for a first signal that is to be transmitted onto a bus of the bus system, wherein the second transmission stage is designed to generate transmission currents for a second signal that is to be transmitted onto the bus as a signal that is differential to the first signal, wherein the third transmission stage is designed to generate transmission currents for the first signal, and wherein the fourth transmission stage is designed to generate transmission currents for the second signal.

According to one exemplary embodiment of the present invention, each of the first to fourth transmission stages comprises at least two current stages connected in parallel with one another, wherein each of the at least two current stages comprises a switchable resistor, and wherein the switchable resistors of a transmission stage have different resistance values, and wherein a number n of the at least two current stages is the same for each of the first to fourth transmission stages, n being a natural number greater than 1. Here, each of the at least two current stages can comprise a CMOS transistor for switching the resistor of the current stage, wherein the CMOS transistor of the current stages of the first transmission stage is a PMOS transistor, wherein the CMOS transistor of the current stages of the second transmission stage is an NMOS transistor, wherein the CMOS transistor of the current stages of the third transmission stage is a PMOS transistor, and wherein the CMOS transistor of the current stages of the fourth transmission stage is an NMOS transistor.

In one example embodiment of the present invention, each of the first to fourth transmission stages also has a polarity reversal diode for protection against positive feedback into a terminal for the bus voltage supply and negative feedback from a terminal for ground, and at least one cascode for protecting the CMOS transistors, wherein at least two cascodes are connected in parallel with one another, wherein a number y of the cascodes is the same for each of the first to fourth transmission stages, y being a natural number greater than 1, and wherein the on-resistance of the at least two cascodes is different.

According to an example embodiment of the present invention, the transmitting module may also have a control circuit for controlling switchable components of the first to fourth transmission stages according to a digital transmit signal and according to an operating mode set for the transmitting module, wherein the control circuit is designed for the temporally staggered and controlled switching of the resistance values of the at least two current stages.

The above=described transmitting module of the present invention can be part of a transmitting/receiving device for a subscriber station for a serial bus system, said transmitting/receiving device also having a receiving module for receiving signals from the bus.

The transmitting/receiving device of the present invention can be part of a subscriber station for a serial bus system, said subscriber station also having a communication control device for controlling the communication in the bus system and for generating a digital transmit signal for controlling the first to fourth transmission stages.

The aforementioned object may also be achieved by a method for transmitting differential signals in a serial bus system having features of the present invention. According to an example embodiment of the present invention, the method is carried out with a transmitting module which has a current limiting circuit and which has a first to fourth transmission stage connected in a full bridge, wherein the method comprises the steps of measuring and evaluating, by means of the current limiting circuit, currents through a first and a second bleeder resistor which are connected to the full bridge, in which the first and fourth transmission stages are connected in series and the third and second transmission stages are connected in series, and generating, by means of the first to fourth transmission stages, differential bus signals for a bus of the bus system in response to the two different values of a digital transmit signal such that the transmitting module generates, in its first operating mode, a first or second bus state on the bus and generates, in its second operating mode, a third or fourth bus state, wherein the bus signals on the bus form a differential voltage of which the voltage value is different for the first to fourth bus states, and wherein the current limiting circuit limits, in the first operating mode of the transmitting module, the current through the second bleeder resistor on the basis of the evaluation of the currents by the current limiting circuit and according to a value of the digital transmit signal, the operating mode of the transmitting module, and the predefined limit value.

The method of the present invention offers the same advantages as mentioned above with respect to the transmitting module of the present invention.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments.

In the figures, identical or functionally identical elements are given the same reference signs unless otherwise indicated.

DETAILED DESCRIPTION OF EXAMPLE EMBODIMENTS

Figures 1, 2:
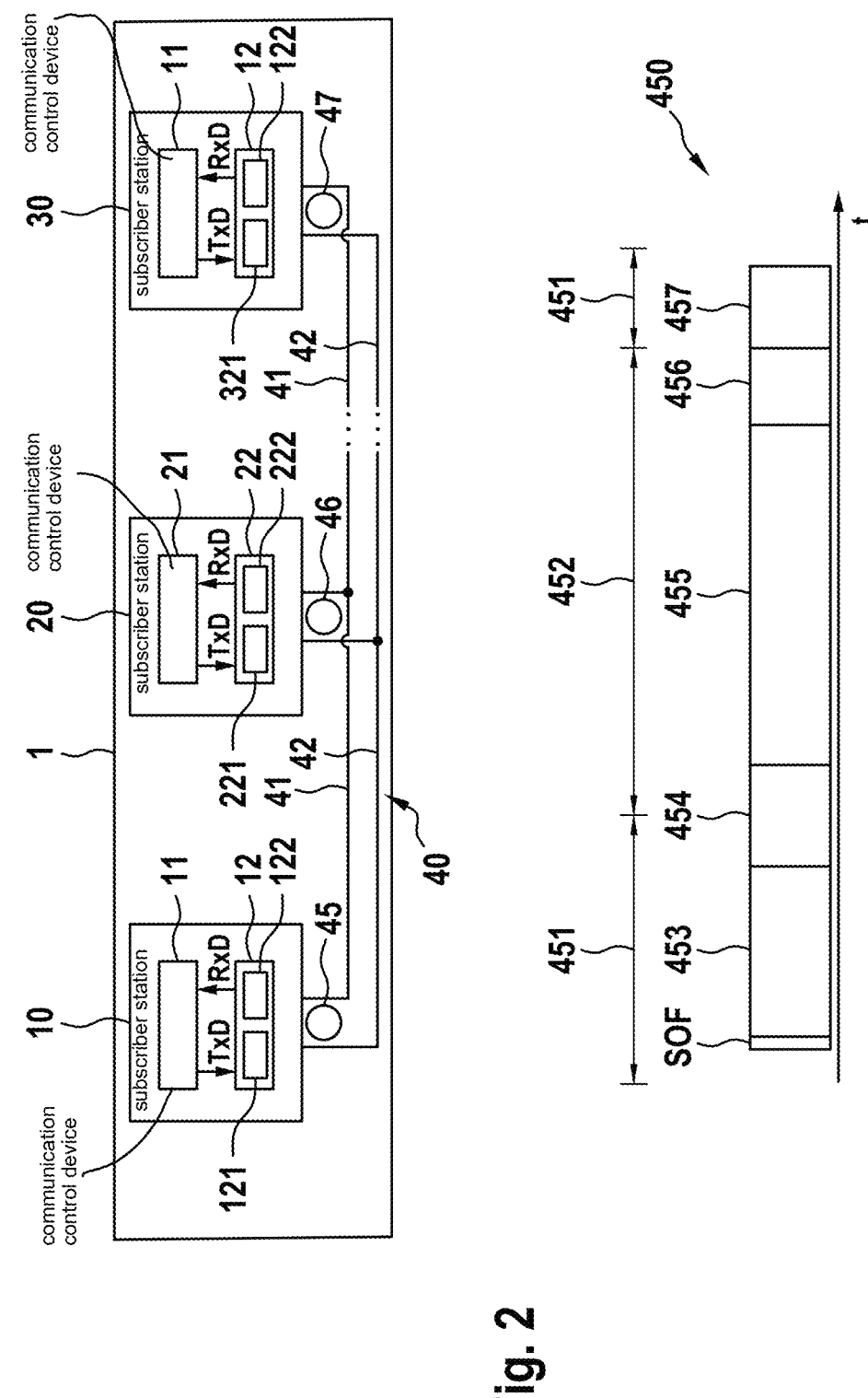
FIG. 1 shows a simplified block diagram of a bus system according to a first exemplary embodiment of the present invention.
FIG. 2 shows a diagram for illustrating the structure of a message which can be transmitted by a subscriber station of the bus system according to the first exemplary embodiment of the present invention.

FIG. 1 shows a bus system 1, which can, for example, at least in sections, be a CAN bus system, a CAN FD bus system, etc. The bus system 1 can be used in a vehicle, in particular a motor vehicle, an aircraft, etc., or in a hospital, etc.

Even though the bus system 1 is described below using CAN bus systems, the bus system 1 is not limited to CAN bus systems. Alternatively, the bus system 1 can be in particular a 10BASE-T1S bus system or another serial bus system 1 which in particular uses differential signals.

In FIG. 1, the bus system 1 has a plurality of subscriber stations 10, 20, 30, which are each connected to a bus 40 or bus line having a first bus wire 41 and a second bus wire 42. The bus wires 41, 42 can also be called CAN_H and CAN_L for the signals on the bus 40. Messages 45, 46, 47 in the form of signals are transferred between the individual subscriber stations 10, 20, 30 via the bus 40. The subscriber stations 10, 20, 30 can be, for example, control units or display devices of a motor vehicle.

As shown in FIG. 1, the subscriber stations 10, 30 each have a communication control device 11 and a transmitting/receiving device 12. The transmitting/receiving device 12 has a transmitting module 121 and a receiving module 122.

The subscriber station 20 has a communication control device 21 and a transmitting/receiving device 22. The transmitting/receiving device 22 has a transmitting module 221 and a receiving module 222.

The transmitting/receiving devices 12 of the subscriber stations 10, 30 and the transmitting/receiving device 22 of the subscriber station 20 are each directly connected to the bus 40, even though this is not shown in FIG. 1.

The communication control devices 11, 21 are each used for controlling communication of the corresponding subscriber station 10, 20, 30 via the bus 40 with at least one other subscriber station of the subscriber stations 10, 20, 30 which are connected to the bus 40.

The communication control devices 11 create and read first messages 45, 47, which are, for example, modified CAN messages 45, 47. The modified CAN messages 45, 47 are constructed, for example, on the basis of the CAN SIC format or the CAN XL format. The transmitting/receiving device 12 is used to transmit and receive the messages 45, 47 to/from the bus. The transmitting module 121 receives a digital transmit signal TxD generated by the communication control device 11 for one of the messages 45, 47 and converts said transmit signal into signals on the bus 40. The receiving module 121 receives signals transmitted on the bus 40, corresponding to the messages 45 to 47, and generates a digital receive signal RxD therefrom. The receiving module 122 transmits the receive signal RxD to the communication control device 11.

The communication control device 21 can be designed as a conventional CAN controller according to ISO 11898-1: 2015, i.e., as a CAN FD-tolerant Classical CAN controller or a CAN FD controller. The communication control device 21 creates and reads second messages 46, for example CAN FD messages 46. The transmitting/receiving device 22 is used to transmit and receive the messages 46 to/from the bus 40. The transmitting module 221 receives a digital transmit signal TxD generated by the communication control device 21 and converts said transmit signal into signals for a message 46 on the bus 40. The receiving module 221 receives signals transmitted on the bus 40, corresponding to the messages 45 to 47, and generates a digital receive signal RxD therefrom. Otherwise, the transmitting/receiving device 22 can be designed like a conventional CAN transceiver.

To transmit the messages 45, 47 with CAN XL or CAN SIC, proven properties are adopted that are responsible for the robustness and user-friendliness of CAN and CAN FD, in particular frame structure with identifier and arbitration according to the conventional CSMA/CR method.

By means of the two subscriber stations 10, 30, messages 45 with different CAN formats, in particular the CAN FD format or the CAN SIC format or the CAN XL format, can be formed and then transmitted and such messages 45 can be received, as described in more detail below.

FIG. 2 shows, for the message 45, a frame 450, which is in particular a CAN XL frame, said frame being provided by the communication control device 11 for the transmitting/receiving device 12 for transmission onto the bus 40. In this case, the communication control device 11 creates the frame

450 as compatible with CAN FD in the present exemplary embodiment. Alternatively, the frame 450 is compatible with CAN SIC.

According to FIG. 2, the frame 450 is divided, for CAN communication on the bus 40, into different communication phases 451, 452, namely an arbitration phase 451 (first communication phase) and a data phase 452 (second communication phase). After a start bit SOF, the frame 450 has an arbitration field 453, a control field 454, a data field 455, a checksum field 456 and a frame termination field 457.

In the arbitration phase 451, with the aid of an identifier (ID) with e.g., bits ID28 to ID18 in the arbitration field 453, negotiation takes place bit by bit between the subscriber stations 10, 20, 30 as to which subscriber station 10, 20, 30 wishes to send the message 45, 46 with the highest priority and will therefore receive exclusive access to the bus 40 of the bus system 1 for the next time for transmission in the subsequent data phase 452. A physical layer such as in CAN and CAN FD is used in the arbitration phase 451. The physical layer corresponds to the bit transmission layer or layer 1 of the conventional OSI model (Open Systems Interconnection Model).

An important point during the phase 451 is that the conventional CSMA/CR method is used, which allows simultaneous access of the subscriber stations 10, 20, 30 to the bus 40 without the higher-priority message 45, 46 being destroyed. As a result, further bus subscriber stations 10, 20, 30 can be added relatively easily to the bus system 1, which is very advantageous. The CSMA/CR method has the consequence that there must be so-called recessive states on the bus 40, which can be overwritten by other subscriber stations 10, 20, 30 with dominant levels or dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use.

In the data phase 452, in addition to a portion of the control field 454, the payload data of the CAN XL frame 450 or of the message 45 from the data field 455 are transmitted, and so is the checksum field 456. The checksum field 456 can contain a checksum of the data of the data phase 452 including the stuff bits, which are inserted by the transmitter of the message 45 as an inverse bit after each predefined number of identical bits, in particular 10 identical bits. At the end of the data phase 452, the arbitration phase 451 is switched back to.

An end field, in particular an acknowledgment field, in the frame termination field 457 may contain at least one acknowledge bit. A sequence of 11 identical bits that indicate the end of the CAN XL frame 450 can also be present. With the at least one acknowledge bit, it can be indicated whether or not a receiver has detected an error in the received CAN XL frame 450 or in the message 45.

A transmitter of the message 45 begins to transmit bits of the data phase 452 to the bus 40 only when the subscriber station 10 as the transmitter has won the arbitration and the subscriber station 10 as the transmitter thus has exclusive access to the bus 40 of the bus system 1 for transmitting.

Thus, in the arbitration phase 451 as the first communication phase, the subscriber stations 10, 30 use, in part, in particular up to the FDF bit (inclusive), a format from CAN/CAN FD, according to ISO11898-1:2015. However, in comparison to CAN or CAN FD, an increase in the net data transfer rate, in particular to over 10 megabits per second, is possible in the data phase 452 as the second communication phase. In addition, an increase in the size of the payload data per frame, in particular to about 2 kilobytes or any other value, is possible. In particular, the value is equal to the value specified for CAN XL in ISO11898-1.

Figure 3:
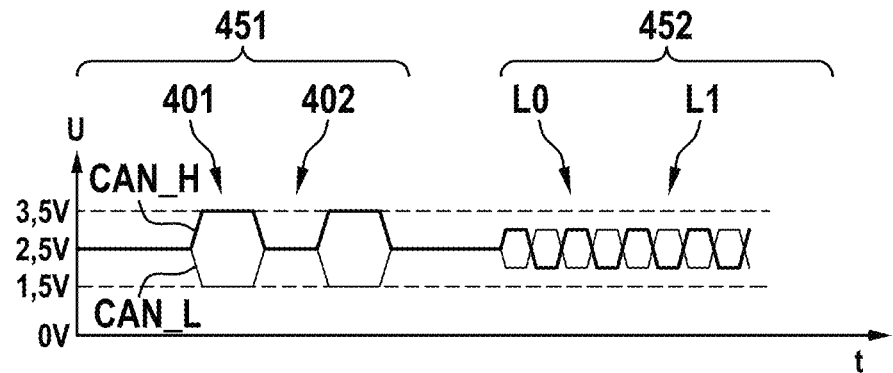
FIG. 3 shows an example of the ideal time curve of bus signals CAN_H, CAN_L in the bus system of FIG. 1.

FIG. 3 shows on the left side that, in the arbitration phase 451, the subscriber stations 10, 20, 30 transmit signals CAN_H, CAN_L onto the bus 40 which alternately have at least one dominant state 401 or at least one recessive state 402. After the arbitration in the arbitration phase 451, one of the subscriber stations 10, 20, 30 is determined as the winner. If it is assumed that the subscriber station 10 has won the arbitration, then, at the end of the arbitration phase 451, the transmitting/receiving device 12 of the subscriber station 10 switches its physical layer from a first operating mode (SLOW) to a second operating mode (FAST_TX), since in the data phase 452 the subscriber station 10 is the transmitter of the message 45. Then, in the data phase 452 or in the second operating mode (FAST_TX), the transmitting module 121 generates, in succession and thus serially, the states L0 or L1 for the signals CAN_H, CAN_L on the bus 40, according to a transmit signal TxD. The frequency of the signals CAN_H, CAN_L can be increased in the data phase 452, as shown on the right side in FIG. 3. Thus, the net data transfer rate is increased in the data phase 452 in comparison to the arbitration phase 451. In contrast, at the end of the arbitration phase 451, the transmitting/receiving device 12 of the subscriber station 30 switches its physical layer from the first operating mode (SLOW) to a third operating mode (FAST_RX), since in the data phase 452 the subscriber station 30 is only a receiver, i.e., not a transmitter, of the frame 450.

After the end of the arbitration phase 451, all transmitting/receiving devices 12 of the subscriber stations 10, 30 switch their operating mode to the first operating mode (SLOW). Thus, all transmitting/receiving devices 12 also switch their physical layer.

Figure 4:
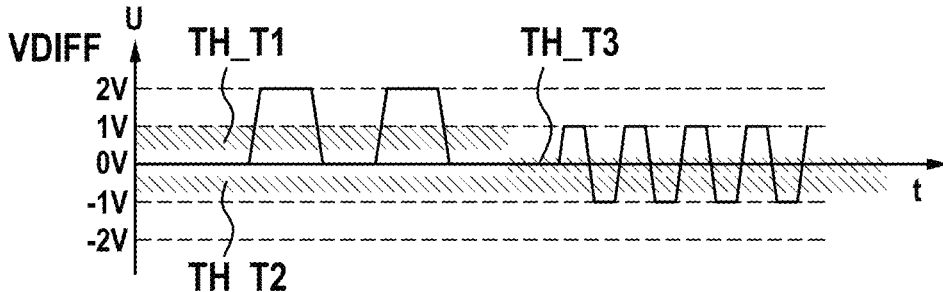
FIG. 4 shows the time curve of a differential voltage VDIFF which forms on the bus of the bus system as a result of the bus signals of FIG. 4.

According to FIG. 4, in the ideal case, a differential signal VDIFF=CAN_H–CAN_L with values of VDIFF=2 V for dominant states 401 and VDIFF=0 V for recessive states 402 is formed on the bus 40 in the arbitration phase 451. This is shown on the left side in FIG. 4. In contrast, a differential signal VDIFF=CAN_H–CAN_L with states L0, L1 is formed on the bus 40 in the data phase 452, as shown on the right side in FIG. 4. The state L0 has a value VDIFF=1 V. The state L1 has a value VDIFF=−1 V. The receiving module 122 can distinguish the states 401, 402 and L0, L1 with the receiving thresholds, which lie in the ranges TH_T1, TH_T2, TH_T3. The receiving module 122 uses at least the receiving threshold T1 of, for example, 0.7 V in the arbitration phase 451. The receiving module 122 uses the receiving threshold T2 of, for example, −0.35 V, for example in the arbitration phase 451, but possibly also in the data phase 452. The receiving threshold T3 of, for example, 0.0 V is used in the data phase 452. When a switch is made between the first to third operating modes (SLOW, FAST_TX, FAST_RX), which are described above with reference to FIG. 3, the receiving module 122 switches the receiving thresholds.

Figure 5:
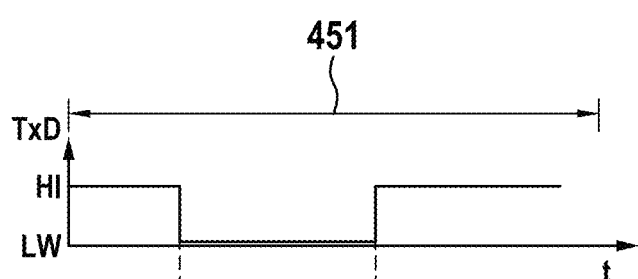
FIG. 5 shows an example of a time curve of a digital transmit signal which is to be converted in the arbitration phase (SIC operating mode) into bus signals CAN_H, CAN_L for a bus of the bus system of FIG. 1.

FIG. 5 shows an example of a part of the digital transmit signal TxD which the transmitting module 121 receives in the arbitration phase 451 from the communication control device 11 and from which said transmitting module generates the signals CAN_H, CAN_L for the bus 40. In FIG. 5, the transmit signal TxD switches from a state LW (low) to a state HI (high) and back to the state LW (low).

Figure 6:
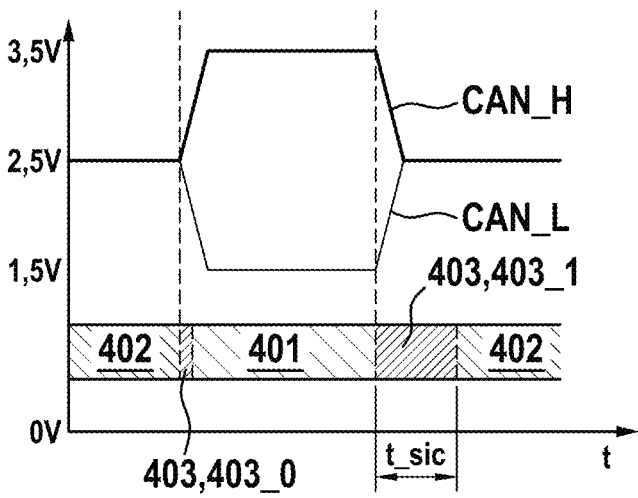
FIG. 6 shows the time curve of the bus signals CAN_H, CAN_L during switching from a recessive bus state to a dominant bus state and back to the recessive bus state, which bus signals are transmitted onto the bus in the arbitration phase (SIC operating mode) due to the transmit signal of FIG. 5.

As shown in more detail in FIG. 6, for the transmit signal TxD of FIG. 5, the transmitting module 121 can generate the signals CAN_H, CAN_L for the bus wires 41, 42 in such a way that a state 403 (sic) is additionally present. The state 403 (sic) can have different lengths, as shown with the state 403_0 (sic) during the transition from the state 402 (rec) to the state 401 (dom) and with the state 403_1 (sic) during the transition from the state 401 (dom) to the state 402 (rec). The state 403_0 (sic) is shorter in time than the state 403_1 (sic). To generate signals according to FIG. 6, the transmitting module 121 is switched to a SIC operating mode (SIC mode).

Passing through the short sic state 403_0 is not required in CiA610-3, and the state is dependent on the type of implementation. The duration of the "long" state 403_1 (sic) is specified for CAN SIC as well as for the SIC operating mode in CAN XL as t_sic<530 ns, starting with the rising edge of the transmit signal TxD of FIG. 5.

In the "long" state 403_1 (sic), the transmitting module 121 should adapt the impedance between the bus wires 41 (CANH) and 42 (CANL) as well as possible to the characteristic impedance Zw of the bus line used. Here, Zw equals 100 ohms or 120 ohms. This adaptation prevents reflections and thus allows operation at higher bit rates. For the sake of simplicity, hereinafter reference will always be made to the state 403 (sic) or sic state 403.

The transmitting module 121 can be used to generate signals for the bus 40 for the following CAN types: CAN FD, CAN SIC and CAN XL.

TABLE 1

| CAN types for transmitting module 121 | | | |
| --- | --- | --- | --- |
| CAN type | Communication phases/ bit rate | Bus states | Transmitting module states |
| CAN FD | Arbitration | dom, rec | dom, rec |
| CAN SIC | Arbitration | dom, sic, rec | dom, sic, rec |
| CAN XL | Arbitration or arbitration and data field for the case in which no switch to the fast operating mode occurs | dom, sic, rec | dom, sic, rec |
| CAN XL | Data phase | L0, L1 | L0, L1 |

Thus, the transmission state or transmitting module state sic can be generated not only with CAN SIC or CAN XL (xl_sic). The transmission state or transmitting module state sic can also be generated with CAN FD. However, in CAN FD, the time for the transmission state or transmitting module state sic can be shorter than with CAN SIC or CAN XL.

Figure 7:
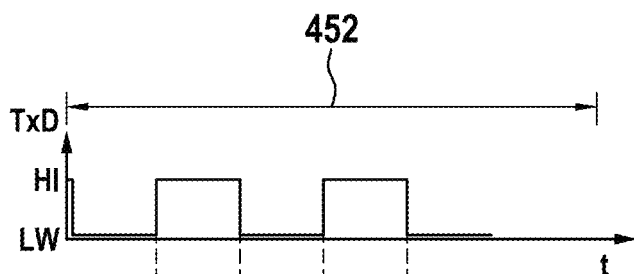
FIG. 7 shows an example of a time curve of a digital transmit signal which is to be converted in the data phase into bus signals CAN_H, CAN_L for the bus of the bus system of FIG. 1.

FIG. 7 shows an example of another part of the digital transmit signal TxD which the transmitting module 121 receives in the data phase 452 from the communication control device 11 and from which said transmitting module generates the signals CAN_H, CAN_L for the bus 40. In FIG. 7, the transmit signal TxD switches several times from a state HI (high) to a state LW (low) and back to a state HI (high) and so on.

Figure 8:
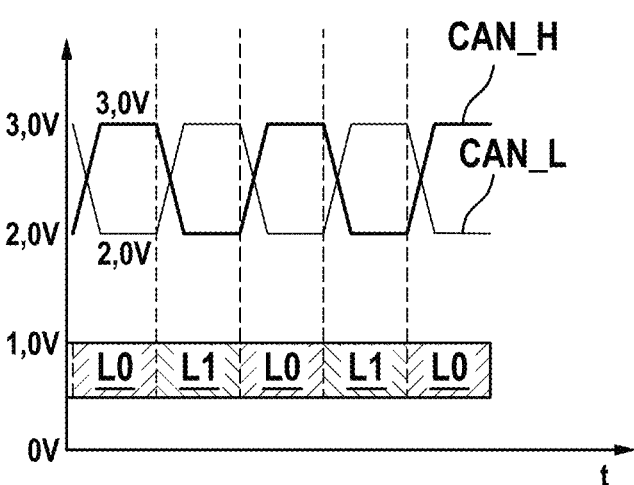
FIG. 8 shows the time curve of the bus signals CAN_H, CAN_L which are transmitted onto the bus in the data phase due to the transmit signal of FIG. 7.

As shown in more detail in FIG. 8, for the transmit signal TxD of FIG. 7, the transmitting module 121 generates the signals CAN_H, CAN_L for the bus wires 41, 42 in such a way that the state L0 is formed for a state LW (low). In addition, the state L1 is formed for a state HI (high).

Figure 9:
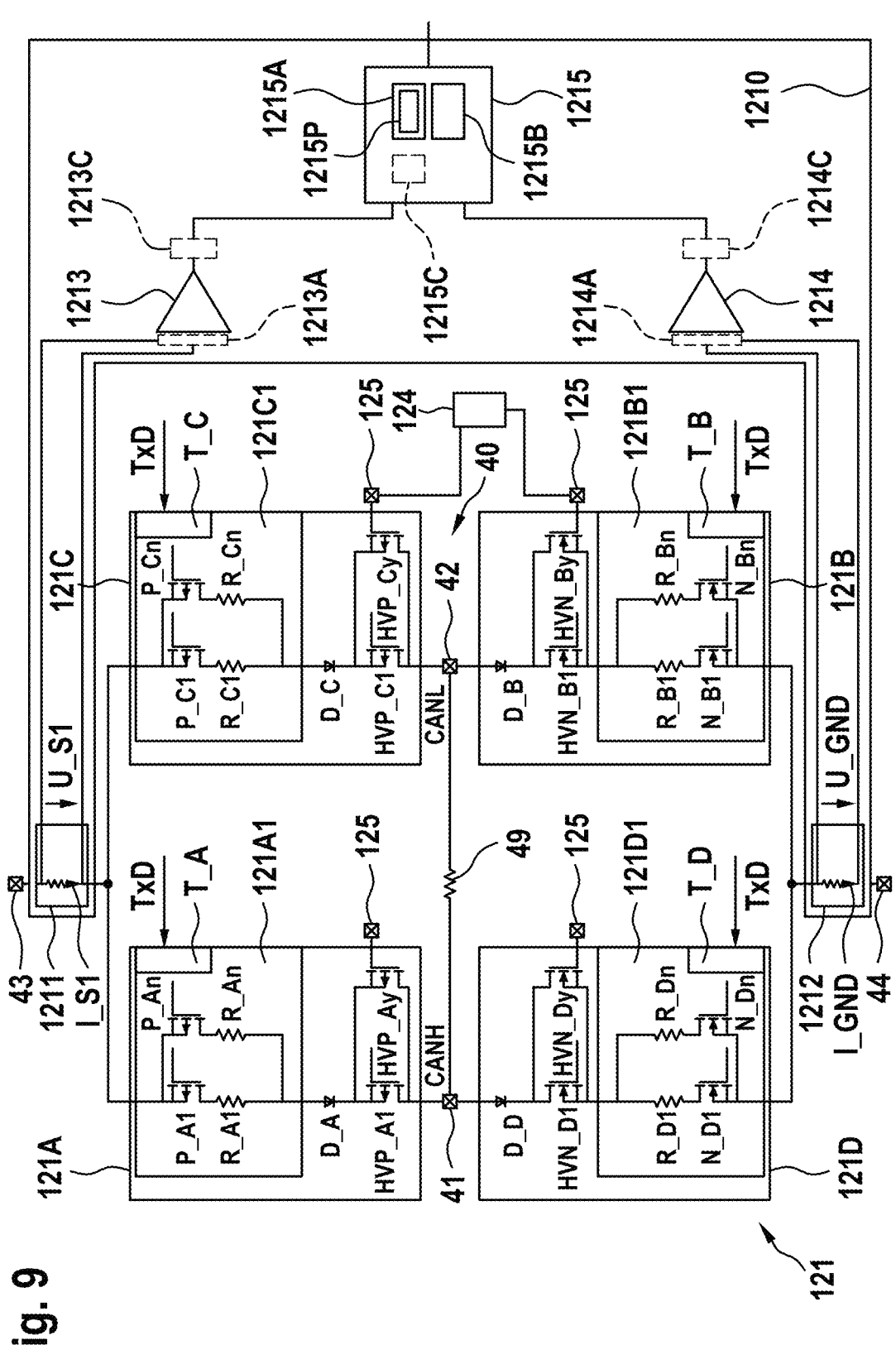
FIG. 9 shows a circuit diagram of a transmitting module with a current limiting circuit for a subscriber station of the bus system according to the first exemplary embodiment of the present invention.

FIG. 9 shows the basic structure of the transmitting module 121 for one of the subscriber stations 10, 30. The transmitting module 121 has a current limiting circuit 1210 and can generate signals CAN_H, CAN_L according to FIG. 6 with the states 401, 402, 403 and signals CAN_H, CAN_L according to FIG. 8 with the states L0, L1. In addition, due to the current limiting circuit 1210, a signal curve for the signals CAN_H, CAN_L according to FIG. 13 can be generated, which signal curve results from the signals of FIG. 12, FIG. 14 and FIG. 15.

The transmitting module 121 has four transmission stages, namely a first transmission stage 121A, a second transmission stage 121B, a third transmission stage 121C, and a fourth transmission stage 121D. As shown in FIG. 9, the transmission stages 121A to 121D are connected as a full bridge.

The current limiting circuit 1210 of the transmitting module 121 has bleeder resistors 1211, 1212, comparators 1213, 1214, on which input filters 1213A, 1214A and/or output filters 1213C, 1214C are arranged, and an operating mode control block 1215. The operating mode control block 1215 has a memory module 1215A for storing information and/or parameters 1215P, an evaluation and switching module 1215B, and optionally a filter 1215C.

The components of the transmission stages 121A to 121D, which components are described in more detail below, are controlled by means of the operating mode control block 1215 and/or at least one control device 124. The operating mode control block 1215 and/or the at least one control device 124 transmits at least one signal to control terminals 125 to which the components of the transmission stages 121A to 121D are connected. For the sake of clarity, not all line connections for this purpose are shown in FIG. 9.

The transmitting module 121 is connected to the bus 40, more precisely to its first bus wire 41 for CAN_H or CAN-XL H and to its second bus wire 42 for CAN_L or CAN-XL L. Each of the transmission stages 121A to 121D is connected to the bus 40.

The voltage supply for supplying the first and second bus wires 41, 42 with electrical energy, in particular with the voltage CAN-Supply of typically 5 V, is effected via at least one terminal 43. The connection to ground or CAN_GND is realized via a terminal 44. The first and second bus wires 41, 42 are terminated with a terminating resistor 49. The terminating resistor 49 is connected in the full bridge as an external load resistor. The resistor 49 is connected in the bridge branch between the terminals for the bus wires 41, 42.

The bleeder resistors 1211, 1212 are used, in one respect, to protect the transmitting module 121 and the external components, in particular other components of the subscriber station 10 and/or the bus 40. The arrangement of the bleeder resistors 1211, 1212 in the circuit of the transmission stage 121 is suitable for the dom state 401 and for the sic state 403 of FIG. 6. According to the design and specification, twice as much electric current flows in the dom state 401 as in the sic state, but in the dom state 401 the current flows only on one path of the transmitting module 121. In contrast, in the sic state, the current flows on two paths of the transmitting module 121. The two paths are designed or configured the same. Thus, the same voltage drop occurs at the bleeder resistors 1211, 1212.

For the current limiting circuit 1210, the bleeder resistors 1211, 1212 are used, in another respect, for voltage measurement and/or current measurement at the transmission stage 121. The bleeder resistors 1211, 1212 can also be called shunt resistors.

The resistors 1211, 1212 usually have a resistance value of <1 ohm. The current limiting circuit 1210 is described in more detail below, after the following description of the transmission stages 121A, 121B, 121C, 121D.

The first transmission stage 121A of FIG. 9 has a polarity reversal diode D_A, a first to a y-th transistor HVP_A1 to HVP_Ay, where y is a natural number >1, and a parallel circuit 121A1 in which a first to an n-th current stage are connected in parallel, where n is a natural number >1. In addition, a control circuit T_A is present. The first current stage has a series circuit composed of a resistor R_A1 and a transistor P_A1. The n-th current stage has a series circuit composed of a resistor R_An and a transistor P_An. Each of the first to y-th transistors HVP_A1 to HVP_Ay is a CMOS transistor, in particular a PMOS transistor. The transistors P_A1 to P_An are CMOS transistors, in particular PMOS transistors. The abbreviation "CMOS" refers to a semiconductor device that uses both p-channel and n-channel MOSFETs on a common substrate. The abbreviation CMOS stands for "complementary metal-oxide-semiconductor". The abbreviation "MOSFET" stands for "metal oxide semiconductor field-effect transistor". The control circuit T_A controls the transistors P_A1 to P_An of the first to n-th current stages according to the transmit signal TxD and the set operating mode SIC, FAST_TX of the transmitting module 121. The control circuit T_A can be controlled by the operating mode control block 1215.

The second transmission stage 121B of FIG. 9 has a polarity reversal diode D_B, a first to a y-th transistor HVN_B1 to HVN_By, where y is the natural number >1, and a parallel circuit 121B1 in which a first to an n-th current stage are connected in parallel, where n is the natural number >1. In addition, a control circuit T_B is present. The first current stage S1 has a series circuit composed of a resistor R_B1 and a transistor N_B1. The n-th current stage has a series circuit composed of a resistor R_Bn and a transistor N_Bn. Each of the first to y-th transistors HVN_B1 to HVN_By is a CMOS transistor, in particular an NMOS transistor. The transistors N_B1 to N_Bn are CMOS transistors, in particular NMOS transistors. The control circuit T_B controls the transistors N_B1 to N_Bn of the first to n-th current stages according to the transmit signal TxD and the set operating mode SIC, FAST_TX of the transmitting module 121. The control circuit T_B can be controlled by the operating mode control block 1215.

The third transmission stage 121C of FIG. 9 has a polarity reversal diode D_C, a first to a y-th transistor HVP_C1 to HVP_Cy, where y is the natural number >1, and a parallel circuit 121C1 in which a first to an n-th current stage are connected in parallel, where n is the natural number >1. In addition, a control circuit T_C is present. The first current stage has a series circuit composed of a resistor R_C1 and a transistor P_C1. The n-th current stage has a series circuit composed of a resistor R_An and a transistor P_An. Each of the first to y-th transistors HVP_C1 to HVP_Cy is a CMOS transistor, in particular a PMOS transistor. The transistors P_C1 to P_Cn are CMOS transistors, in particular PMOS transistors. The control circuit T_C controls the transistors P_C1 to P_Cn of the first to n-th current stages according to the transmit signal TxD and the set operating mode SIC, FAST_TX of the transmitting module 121. The control circuit T_C can be controlled by the operating mode control block 1215.

The fourth transmission stage 121D of FIG. 9 has a polarity reversal diode D_D, a first to a y-th transistor HVN_D1 to HVN_Dy, where y is the natural number >1, and a parallel circuit 121D1 in which a first to an n-th current stage are connected in parallel, where n is the natural number >1. In addition, a control circuit T_D is present. The first current stage has a series circuit composed of a resistor R_D1 and a transistor N_D1. The n-th current stage has a series circuit composed of a resistor R_Dn and a transistor P_Dn. Each of the first to y-th transistors HVN_D1 to HVN_Dy is a CMOS transistor, in particular an NMOS transistor. The transistors N_D1 to N_Dn are CMOS transistors, in particular NMOS transistors. The control circuit T_D controls the transistors N_D1 to N_Dn of the first to n-th current stages according to the transmit signal TxD and the set operating mode SIC, FAST_TX of the transmitting module 121. The control circuit T_D can be controlled by the operating mode control block 1215.

The current stages S1 to Sn of the transmission stages 121A to 121D are thus designed as resistance stages. The resistance stages are set by selecting the resistance value of the corresponding current stage, for example by selecting the resistors R_A1 to R_An for the transmission stage 121A, etc. As a result of setting the resistance values of the resistors, current stages are set. The number n can be chosen arbitrarily. In particular, the number n and thus the number of stages or number of resistance stages or current stages can be selected between 1 and 60. Alternatively, however, a number larger than 60 can be chosen for n.

Each of the polarity reversal diodes D_A, D_B, D_C, D_D protects the associated transmission stage against positive feedback to the terminal 44 (CAN-Supply) and negative feedback to the terminal 43 (CAN_GND). Each of the polarity reversal diodes D_A, D_B, D_C, D_D can also be called a blocking diode.

Each of the parallel circuits 121A1, 121B1, 121C1, 121D1, more precisely the associated control circuit T_A, T_B, T_C, T_D, and/or the operating mode control block 1215, sets a resistance value for the associated transmission stage 121A, 121B, 121C, 121D according to the operating mode (SLOW or SIC, FAST_TX) of the transmitting module 121 and the transmit signal TxD. The resistance value of the individual transmission stage 121A, 121B, 121C, 121D can thus be set depending on the operating mode (SLOW or SIC, FAST_TX) of the transmitting module 121 and the transmit signal TxD. This is described in more detail below using FIG. 10 and FIG. 11 as well as Table 2 and Table 3.

Each of the transistors HVP_A1 to HVP_Ay, HVN_B1 to HVN_By, HVP_C1 to HVP_Cy, HVN_D1 to HVN_Dy is an HV cascode and can also be called an HV standoff device. The transistors HVP_A1 to HVP_Ay protect the associated CMOS transistors P_A1 to P_An of the associated parallel circuit 121A1, since the corresponding transistor(s) HVP_A1 to HVP_Ay absorb high voltage drops. Each of the transistors HVN_B1 to HVN_By, HVP_C1 to HVP_Cy, HVN_D1 to HVN_Dy has the same function for the CMOS transistors of the corresponding associated parallel circuit 121B1, 121C1, 121D1. Each of the transistors HVP_A1 to HVP_Ay, HVN_B1 to HVN_By, HVP_C1 to HVP_Cy, HVN_D1 to HVN_Dy is connected, at its control terminal, to the terminal 125. Thus, each of the transistors HVP_A1 to HVP_Ay, HVN_B1 to HVN_By, HVP_C1 to HVP_Cy, HVN_D1 to HVN_Dy is controllable by the at least one control device 124 and/or the operating mode control block 1215.

In the transmitting module 121, the transmission stage 121A is connected between the terminal 43 for the voltage supply and the terminal 41 (CANH) for the signal CAN_H. The transmission stage 121C is connected between the terminal 43 for the voltage supply and the terminal 42 (CANL) and the terminal 43 for ground or the terminal 44 (CAN_GND). The transmission stage 121D is connected between the terminal 41 (CANH) for the signal CAN_H and the terminal 43 for ground or the terminal 44 (CAN_GND). The transmission stage 121B is connected between the terminal 42 (CANL) for the signal CAN_L and the terminal 43 for ground or the terminal 44 (CAN_GND). Thus, in the transmitting module 121, firstly the transmission stage 121A is connected into the CANH path. Secondly the transmission stage 121D is connected into the CANH path. Firstly the transmission stage 121C is connected into the CANL path. Secondly the transmission stage 121B is connected into the CANL path.

Thus, the transmitting module 121 consists, in the CANH path and in the CANL path, of a parallel circuit 121A1, 121B1, 121C1, 121D1 of a certain number of current stages. A single current stage is realized by a series circuit consisting of a CMOS switch and a resistor, as described above. The parallel connection of all current stages is connected, in the CANH path and in the CANL path, in series with an HV cascode HVP_A1 to HVP_Ay, HVN_B1 to HVN_By, HVP_C1 to HVP_Cy, HVN_D1 to HVN_Dy and a polarity reversal diode D_A, D_B, D_C, D_D, as described above. The HV cascodes HVP_A1 to HVP_Ay, HVN_B1 to HVN_By, HVP_C1 to HVP_Cy, HVN_D1 to HVN_Dy make it possible to comply with to limit values (maximum rating parameters), such as voltage at CANH and CANL of −27 V to +40 V.

The basic operation of the circuit of FIG. 9 according to the operating mode of the transmitting module 121 and the bus state 401 (dom), 403 (sic), 402 (rec) in the SIC operating mode (arbitration phase 451) and L0, L1 in the data phase 452 is explained using the following Table 2. Table 2 indicates—according to the state of the transmitting module 121 and the operating mode of the phases 451, 452—the required impedance depending on the state of the transmitting module 121, as well as the impedance of the transmission stages 121A/121B and the impedance of the transmission stages 121C/121D. The values for the impedance of the transmission stages 121A/121B and 121C/121D indicated in Table 2 below result in impedance-adapted transmission states, where the following applies: R_diff_transmitting_module=characteristic impedance Zw on the bus 40. This minimizes reflections in the bus system 1.

If the impedance is "infinite", the transmitting module 121 or the particular transmission stage 121A, 121B, 121C, 121D is switched off or switched so as to be non-conductive.

Alternatively, however, for the bus states L0, L1, other impedances for the transmission stages 121A/121B and 121C/121D than those specified in Table 2 are possible. For example, for the transmission stages 121A/121B, the impedances 65‖0 for the bus states L0, L1 could be generated instead of impedances of 55‖600 for the bus states L0, L1. This would also set the correct voltage for L0, L1 on the bus 40, but would set a differential resistance of R_diff=2*65=130 ohms. This would make the reflection coefficient gamma=(R_diff−Zw)/(Rdiff+Zw)=30/230=0.13, which may be acceptable depending on the implementation. The same applies, correspondingly, to the transmission stages 121C/121D, for which the impedances 0‖65 for the bus states L0, L1 can be generated instead of impedances of 600‖55 for the bus states L0, L1.

The division of each parallel circuit 121A1, 121B1, 121C1, 121D1 of FIG. 9 into n parts or the n current stages allows a temporally staggered and controlled switching process between the bus states 401, 402, 403 in the arbitration phase (SIC operating mode) 451 or between the bus states L0, L1 of the data phase 452. The resistance values of the resistors of the n current stages are set for this purpose, as illustrated with FIG. 10 in a specific example.

Figure 10:
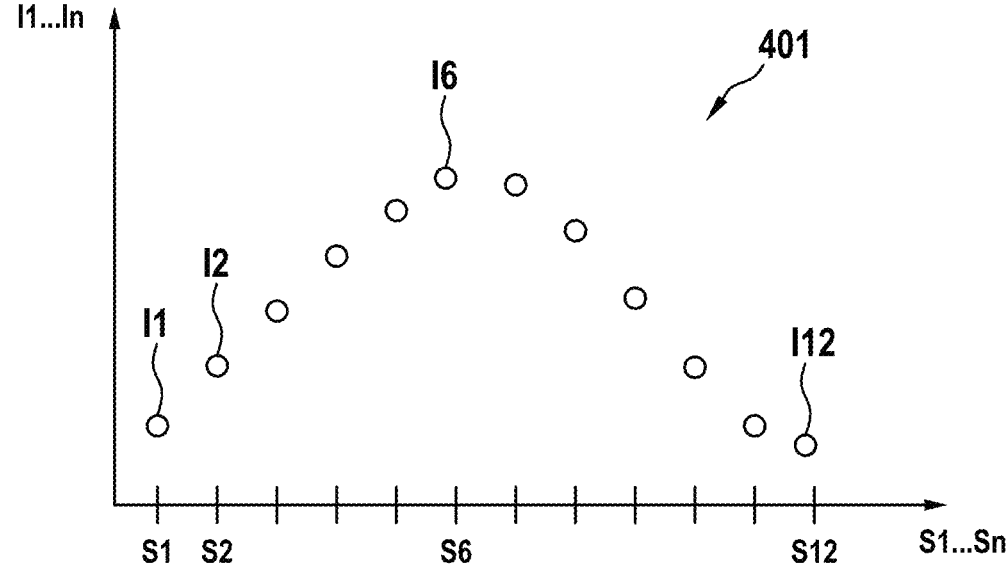
FIG. 10 shows a time graph illustrating the switching on of various current stages of a transmission stage for a first specific example of the transmitting module of FIG. 9 of the present invention.

FIG. 10 shows an example of the current level for each switching stage or current stage S1 to S12. Thus, in the example shown, twelve current stages S1, S2 to S6 to S12 are used for each of the parallel circuits 121A1, 121B1, 121C1, 121D1. Therefore, n=12.

The value of the current I (vertical axis in FIG. 10) or I1, I2, I6, I12, etc. is set by the selection of the serial resistance value of the corresponding current stage S1 to S12. The individual current stages S1 to S12 (horizontal axis in FIG. 10) therefore have different resistance values.

TABLE 2

| Required impedance according to transmission state | | | | | |
|---|---|---|---|---|---|
| | | Operating mode of the transmitting module 121 | | | |
| | | CAN FD, CAN SIC, CAN XL (xl_sic) (transmission operating mode in arbitration phase 451) | | | CAN XL (xl_fasttx) (transmission operating mode in data phase 452) | |
| | Bus state | dom | sic | rec | L0 | L1 |
| | VDIFF in volts (V) | 2 | 0 | 0 | 1 | −1 |
| Impedance | Required impedance in ohms (Ω) between bus wire 41 (CANH) and 42 (CANL) | Not specified | about 100, for matching with Zw of 41, 42 | infinite | about 100, for matching with Zw of 41, 42 | about 100, for matching with Zw of 41, 42 |
| | Transmission stages 121A/121B: Typical values in ohms (Ω) | about 20 | about 100 | infinite | about 55 | about 600 |
| | Transmission stages 121C/121D: Typical values in ohms (Ω) | infinite | about 100 | infinite | about 600 | about 55 |
| | Resulting impedance in ohms (Ω) between bus wire 41 (CANH) and 42 (CANL) | about 40 | about 100 | infinite | about 100 | about 100 |

To generate the bus states 401, 402, 403 in the arbitration phase (SIC operating mode) 451 or the bus states L0, L1 of the data phase 452, the individual current stages S1 to S12 are switched on or off with temporal offset using the CMOS transistors of the current stages S1 to S12. As a result, a corresponding electric current I flows in the CANH path or CANL path into which the superordinate transmission stage 121A, 121B, 121C, 121D is connected.

In general, it is advantageous to design the staggering (stagger stages) and resistors per switching stage or current stage S1 to S12 in such a way that the shape of the differential signal VDIFF follows the Gaussian error function. Analytically, this produces the lowest emission.

For the transition from a state 402 (recessive) to a state 401 (dominant), which corresponds to a rising edge of the differential voltage VDIFF of FIG. 4, the current in the CANH path and in the CANL path is gradually increased to generate a dominant level on the bus 40 by the temporally offset switching in of the resistors of the parallel circuits 121A1, 121B1, 121C1, 121D1. The transition from a state 401 (dominant) to a state 402 (recessive), which corresponds to a falling edge of the differential voltage VDIFF of FIG. 4, is carried out correspondingly by the temporally offset disconnecting of the resistors of the parallel circuits 121A1, 121B1, 121C1, 121D1, whereby the current in the CANH and CANL path is gradually reduced. The total current, which is given by the sum of the currents I1 to I12 or I1 to In of all current stages S1 to Sn, flows during the state 401 (dominant). Here, all current stages S1 to Sn of the parallel circuits 121A1, 121B1, 121C1, 121D1 are switched on and the total current for generating the dominant level of nominally VDIFF=2 V flows through the bus resistor or terminating resistor 49.

By setting the timing and by selecting the current levels of the individual current stages S1 to S12 by setting the resistance values of their resistors, as described above, it is possible to align the bus signals CAN_H, CAN_L with one another during the transition between the states 401, 402, so that the symmetrical curve of CAN_H and CAN_L according to FIG. 6 is realized. The structure of the transmitting module 121 enables the individual current stages of the parallel circuits 121A1, 121B1, 121C1, 121D1 to be switched on with temporal offset. This temporal control makes it possible to align the signal shape of CAN_H and CAN_L as required in FIG. 6. Specific shaping of the signal curves for CAN_H and CAN_L is possible. Overall, the bus states 401, 402, 403 in the arbitration phase (SIC operating mode) 451 or the bus states L0, L1 of the data phase 452 can be shaped according to the specifications.

The resistors of the individual current stages S1 to Sn of the parallel circuits 121A1, 121B1, 121C1, 121D1 and thus their corresponding share of the total current can be selected in different ways in order to achieve the lowest possible emission, in particular a low emission of the transmitting module 121. For low emission, it is advantageous to switch in or switch out little current I (high resistance value) at the beginning and end of a switching operation between bus states 401, 402 and to switch in or switch out much current (low resistance value) in the middle of the switching operation. Therefore, the setting of the currents of the current stages S1 to S12 that is shown in FIG. 10 is very advantageous.

In contrast to an implementation with identical resistors in the current stages S1 to Sn of the parallel circuits 121A1, 121B1, 121C1, 121D1, the configuration according to FIG.

10 avoids a current increase during the switch-off, the transition from the state 401 (dominant) to the state 402 (recessive).

The granularity of the temporal staggering for the switching on or off of the individual current stages S1 to S12 is in a range of about 2 ns. Small intervals or steps of this kind for the temporal staggering cause little common mode interference and have little negative impact on the emission. The voltage steps, which are set via the resistors or resistance stages of the current stages S1, S2 to S6 to S12, are kept fixed and the temporal staggering is varied so that, during the switch-on process, the smoothest possible behavior arises (according to the Gaussian error function). The variation of the time steps or time intervals also prevents the occurrence of a narrow-band frequency line in the emission frequency spectrum.

Alternatively, the staggering steps can be implemented using fixed time steps and varied voltage steps.

The shown structure of the transmitting module 121 enables symmetrical switching of the bus signals CAN_H and CAN_L (FIG. 6) with steep switching edges between the bus states 401, 402, 403 in the arbitration phase (SIC operating mode) 451 or between the bus states L0, L1 of the data phase 452.

Firstly, the illustrated structure of the transmitting module 121 realizes much steeper switching edges between the bus states 401, 402, 403 in the arbitration phase (SIC operating mode) 451 or between the bus states L0, L1 of the data phase 452 due to the use of fast CMOS switches or CMOS transistors. Secondly, the symmetry of the time curves of the bus signals CAN_H and CAN_L which is necessary to comply with the emission limit values is achieved during the switching processes. Matching of the characteristic curves is achieved by the selection or use of the resistors of the parallel circuits 121A1, 121B1, 121C1, 121D1. This means that the matching of the characteristic curves is less dependent on the parameters of the transistors used in the parallel circuits 121A1, 121B1, 121C1, 121D1.

The CMOS transistors of the transmission stages 121A1, 121B1, 121C1, 121D1 are operated as switches, i.e., with a maximum voltage between the gate terminal and the source terminal. The matching of the individual transmission stages 121A1, 121B1, 121C1, 121D1 therefore depends largely on the matching of the resistors R_A1 to R_An, R_B1 to R_Bn, R_C1 to R_Cn, R_D1 to R_Dn and no longer on the transistors P_A1 to P_An and P_C1 to P_Cn (PMOS) on the bus wire 41 (CANH) and the transistors N_D1 to N_Dn and N_B1 to N_Bn (NMOS) on the bus wire 42 (CANL).

The dominant state 401 (dom) is determined by matching of the resistors R_A1 to R_An (transmission stage 121A) with the resistors R_B1 to R_Bn (transmission stage 121B). Here and in the following, the term "matching" means, according to one possibility, an active trimming step. According to another possibility, "matching" means that the resistance values are as compatible as possible, which standardly occurs without a matching step or trimming step.

The sic state (sic) is determined by matching of the resistors R_A1 to R_An (transmission stage 121A) with the resistors R_C1 to R_Cn (transmission stage 121C) and by matching of the resistors R_D1 to R_Dn (transmission stage 121D) with the resistors R_B1 to R_Bn (transmission stage 121B).

In the XL Fast operating mode, the state L0 is determined by matching of the resistors R_A1 to R_An (transmission stage 121A) with the resistors R_B1 to R_Bn (transmission stage 121B). The state L1 is determined by matching of the resistors R_C1 to R_Cn (transmission stage 121C) with the resistors R_D1 to R_Dn (transmission stage 121D).

The on-resistance Ron of the respective transistors of the transmission stages 121A1, 121B1, 121C1, 121D1 should be significantly smaller than the corresponding series-connected resistance of the individual current stages of the transmission stages 121A1, 121B1, 121C1, 121D1.

Figure 11:
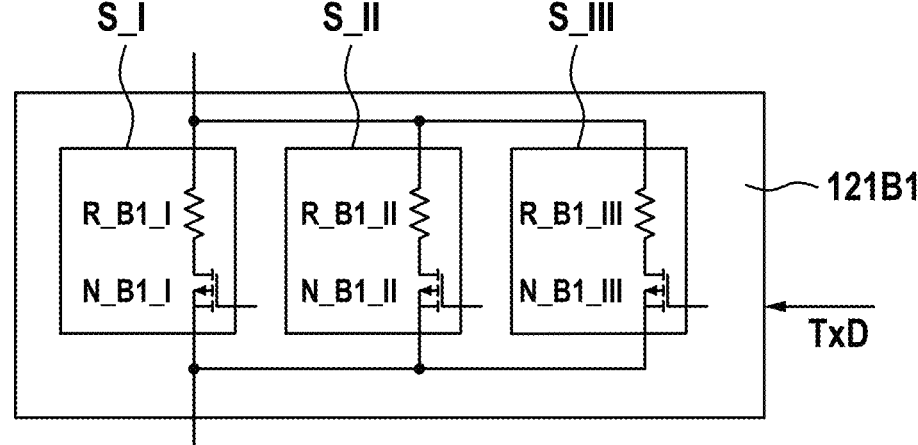
FIG. 11 shows a detail of a transmission stage for a second specific example of the transmitting module of FIG. 9 of the present invention.

FIG. 11 shows a specific example of the structure of the transmission stage 121B of FIG. 9. According to this, the transmission stage 121B has three current stages S_I, S_II, S_III in the parallel circuit 121B1. The first current stage S_I has a resistor R_B1_I and a transistor N_B1_I which is connected in series. The second current stage S_II has a resistor R_B1_II and a transistor N_B1_II which is connected in series. The third current stage S_III has a resistor R_B1_III and a transistor N_B1_III which is connected in series.

For the following description of the circuit of FIG. 9 with the configuration according to FIG. 11, it is assumed that each of the transmission stages 121A, 121C, 121D likewise has three current stages S_I, S_II, S_III in its associated parallel circuit 121A1, 121C1, 121D1 in accordance with the example of FIG. 11.

The following Table 3 shows the control of the three transistors N_B1_I, N_B1_II, N_B1_III of the transmission stage 121B of FIG. 11 and of the corresponding transistors of the transmission stages 121A, 121C, 121D of FIG. 9, according to the transmission stages 121A/121B and the transmission stages 121C, 121D.

stages 121A/D and 121C/B of the full bridge (effect 2), so that in a sic state 403 a change in the common mode voltage in comparison with the rec state 402 is minimized or prevented. This is particularly advantageous, because only if, starting from the common mode level of the rec state 402, the common levels in the dom state 401 and in the sic state 403 match those of the rec state 402, a sufficient emission result can be achieved, but the causes that lead to the behavior of effect 1 may be different from those that lead to effect 2.

The transmitting module 121 is also able to reduce effects due to asymmetrical behavior of the transmission stages, which effects are possible in the transmission states dom (401), sic (403), rec (402), L0, L1 and increase the overshoot and therefore worsen the emission. The transmitting module 121 prevents unequal behavior of components in the transmission stages 121A0, 121B0 (effect 1) of the full bridge of FIG. 12, so that in the dom state 401 a change in the common mode voltage in comparison with the rec state 402 is minimized or prevented.

In order to prevent effect 1, the resistance Ron (on-resistance) of the cascodes in the transmission stages 121A, 121B can be changed, in particular by control with the corresponding associated control circuit T_A, T_B. This is done by changing the up to y transistors HVP_A1 to HVP_Ay connected in parallel and/or the up to y transistors HVN_B1 to HVN_By connected in parallel. In order not to change the symmetry of the two series circuits of the transmission stages 121A0, 121D0 and of the transmission

TABLE 3

| Required impedance according to transmission state | | | | |
| --- | --- | --- | --- | --- |
| Operating mode of the transmitting module 121 | CAN FD, CAN SIC, CAN XL (xl_sic) (transmission operating mode in arbitration phase 451) | | | CAN XL (xl_fasttx) (transmission operating mode in data phase 452) | |
| Bus state | dom | sic | rec | L0 | L1 |
| 121A/121B: Typical values in ohms (Ω) | about 20 | about 100 | infinite | about 60 | infinite |
| Transistor I | on | on | off | on | off |
| Transistor II | on | off | off | on | off |
| Transistor III | on | off | off | off | off |
| 121C/121D: Typical values in ohms (Ω) | infinite | about 100 | infinite | infinite | about 60 |
| Transistor I | off | on | off | off | on |
| Transistor II | off | off | off | off | on |
| Transistor III | off | off | off | off | off |

In this way, with the transmitting module 121 the required steeper edges on the bus signals CAN_H and CAN_L can be generated and the emission limit values can be complied with.

Alternatively, more than three current stages can be used in each of the transmission stages 121A, 121B, 121C, 121D, as described above.

The described transmitting module 121 can reduce effects due to asymmetrical behavior of the transmission stages 121A, 121B, 121C, 121D, which effects are possible in the transmission states dom, sic, rec or 401, 403, 402 and worsen the emission. The transmitting module 121 prevents unequal behavior of components in the transmission stages 121A, 121B (effect 1) of a full bridge, so that in the dominant state 401 a change in the common mode voltage in comparison with the rec state 402 is minimized or prevented. In addition, the transmitting module 121 can prevent unequal behavior of components in transmission stages 121C0, 121B0 in the sic state 403, the cascodes of the transmission stages 121D0, 121C0 must also undergo the same change. Therefore, the up to y transistors HVN_D1 to HVP_Dy connected in parallel and/or the up to y transistors HVP_C1 to HVP_Cy connected in parallel are also changed accordingly. For this purpose, each of the transistors HVP_A1 to HVP_Ay, HVN_B1 to HVN_By, HVP_C1 to HVP_Cy, HVN_D1 to HVP_Dy is connected, at its control terminal (gate terminal), to a terminal 125. Thus, each of these transistors can be controlled by the at least one control device 124. The intervention to correct the common mode level in the dom state 401 is carried out via a similar or same change of HVP_A1 to HVP_Ay and HVP_C1 to HVP_Cy or via a similar or same change of HVP_D1 to HVN_Dy and HVP_B1 to HVN_By.

In addition, the design of the transmitting module 121 can prevent, in particular, substrate current losses in the polarity reversal diodes D_A and D_B from causing the common mode level in the dom state 401 to no longer be correct. In the sic state, the polarity reversal diodes D_A and D_B are less strongly current-carrying and furthermore all polarity reversal diodes D_A, D_B, D_C, D_D of the four transmission stages 121A, 121B, 121C, 121D are active. The transmitting module 121 can prevent different common mode levels from being present in the dom state and in the sic state. In addition, the generation of qualitatively identical effects by unequal behavior in the cascodes can be prevented.

Thus, the transmitting module 121 can positively influence the effects on the emission values of the transmitting/receiving device 12, which are significantly influenced by the transmitting module 121.

To comply with the limit values for interference emission that are specified in the specification/standard CiA610-3, the current limiting circuit 1210 of FIG. 9 uses the following property of the transmitting module 121 of FIG. 9.

In order to achieve a differential voltage VDIFF=CAN_H−CAN_L for the bus state L0 of approximately 1 V in the data phase 452, which can also be referred to as VDIFF_L0=approximately 1 V, the transmission stages 121A, 121B are each operated with an impedance of about or approximately 65 ohms. Here, the transmission stages 121C, 121D are blocking or at least have significantly higher impedance than the transmission stages 121A, 121B. In conjunction with the external bus load resistor 49, which has a resistance value RL=50 ohms, a current of approximately 20 mA flows in the bus state L0 and the differential voltage VDIFF_L0 is about or approximately 1 V. The current limiting circuit 1210 uses this property not only for the data phase 452, but also for the arbitration phase 451, to limit the current of the transmitting module 121 in the dominant bus state 401. This is necessary because, for the dom state 401 for the transmitting module 121 with a bus load resistor 49 having a resistance value RL=50 ohms, the following applies to the current of the transmitting module 121:

A) Differential voltage VDIFF_dom=CAN_H_dom−CAN_L_dom=2 V,

B) Dominant state transmission current: I_dom=VDIFF_dom/RL=2 V/50 ohms=40 mA,

C) Resistance of the transmission stage 121B in the dominant state: R_PartB_dom=(U_CANL_dom−U_CANL_dio)/I_dom=(1.5 V−0.7 V)/40 mA=20 ohms, which is the equivalent resistance for the circuit consisting of switches N_B1 to N_B1n and the resistors R_B1 to R_B1n in total, D) Current during short circuit in the dominant state 401: I_dom_SC=U_Source_HVN_B_max/R_PartB_dom=4 V/20 ohms=200 mA=>exceedance of the prescribed limit value LV (FIG. 14) of max. 115 mA.

In order to avoid or correct this exceedance of the prescribed limit value LV (FIG. 14) of max. 115 mA, the current limiting circuit 1210 proceeds as follows.

The comparator 1213 in FIG. 9 detects the voltage drop or the voltage U_S1 across the resistor 1211 or a current I_S1. The comparator 1214 detects the voltage drop or the voltage U_GND across the resistor 1212 or a current I_GND. If the voltage U_S1 at the resistor 1211 exceeds a predefined limit value LV (FIG. 14), the comparator 1213 signals this to the operating mode control block 1215. If the voltage U_GND at the resistor 1212 exceeds a predefined limit value, the comparator 1214 signals this to the operating mode control block 1215. In particular, the predefined limit value LV (FIG. 14) is set in such a way that the current limit of 115 mA is not exceeded, which corresponds to the maximum value from the specification/standard CiA610-3.

In the operating mode control block 1215, the information and/or parameters 1215P about the transmitting module 121 are present in the memory module 1215A. The information and/or parameters 1215P include levels of the transmit signal TxD, the operating mode of the transmitting module 121, the state of the transmitting module 121, and the like. The state of the transmitting module 121 can also be called the transmitter state.

The operating mode control block 1215 of FIG. 9 is designed to evaluate the signals at the outputs of the comparators 1213, 1214 with respect to an overcurrent and to set the state of the transmitting module 121 accordingly. In addition, the operating mode control block 1215 is designed to evaluate the transmit signal TxD (FIG. 5, FIG. 7, FIG. 12), i.e., which state HI, LW the transmit signal TxD has. The operating mode control block 1215 is designed to combine the two evaluations mentioned, as follows.

If the evaluation of the operating mode control block 1215 shows that in the transmit signal TxD a dominant state 401 is currently present in which the conditions that TxD=LW (FIG. 5, FIG. 7, FIG. 12) and that the comparators 1213, 1214 signal at their outputs a sustained overcurrent are met, the operating mode control block 1215 sets the state L0 for the transmitting module 121, which state is shown in FIG. 8 and described above. Here, the typical voltage VDIFF_L0_typ for the differential voltage Vdiff for the L0 state is usually VDIFF_L0 typ=CAN_H−CAN_L=1 V, as mentioned above.

With the current limiting circuit 1210 of FIG. 9, the following current limiting value I_L0 SC results:

A) L0 transmission current I_L0=VDIFF_L0/RL=1 V/50 ohms=20 mA

B) Resistance of the transmission stage 121B in the L0 state: R_PartB_L0=(U_CANL_L0−U_CANL_dio)/I_L0=(2 V−0.7 V)/50 ohms=65 ohms D) Current during short circuit in the L0 state: I_Level0_SC=U_Source_HVN_B_max/R_PartB_L0=4 V/65 ohms=61 mA.

Consequently, the current limiting circuit 1210 of FIG. 9 ensures that the prescribed limit value LV (FIG. 14) of max. 115 mA is not exceeded. The current limiting circuit 1210 of FIG. 9 can thus achieve compliance with the limit values for interference emission according to the applicable standards.

FIG. 12 to FIG. 15 show signals for a specific example to explain in more detail the function of the current limiting circuit 1210 of FIG. 9 for compliance with the limit values for interference emission.

The example assumes that, for example, in the transmission stage 121B a voltage of about 4 V occurs at the source of the switches HVN_B1 to HVN_Bn in the event of a short circuit of, for example, U_CANL_SC=18 V (CiA610-3, −3 V . . . +18 V). This results in the case of controlling the cascode HVN_B with 5 V minus a switch threshold voltage, in particular MOS threshold voltage, of about 1 V. Thus, in the event of a short circuit of greater than or equal to 5 V, about 4 V always occurs at the source of the switch HVN_B.

In the example of FIG. 12 to FIG. 15, it is assumed that the current limiting circuit 1210 of FIG. 9 has either the filters 1213A, 1214A with a filter time period T_F1 or the filters 1213C, 1214C with the filter time period T_F1 or the filter 1215C with the filter time period T_F1. In addition, the current limiting circuit 1210 of FIG. 9 uses a filter time period T_F0, which is generated with at least one of the aforementioned filters.

Figures 12, 13, 14, 15:
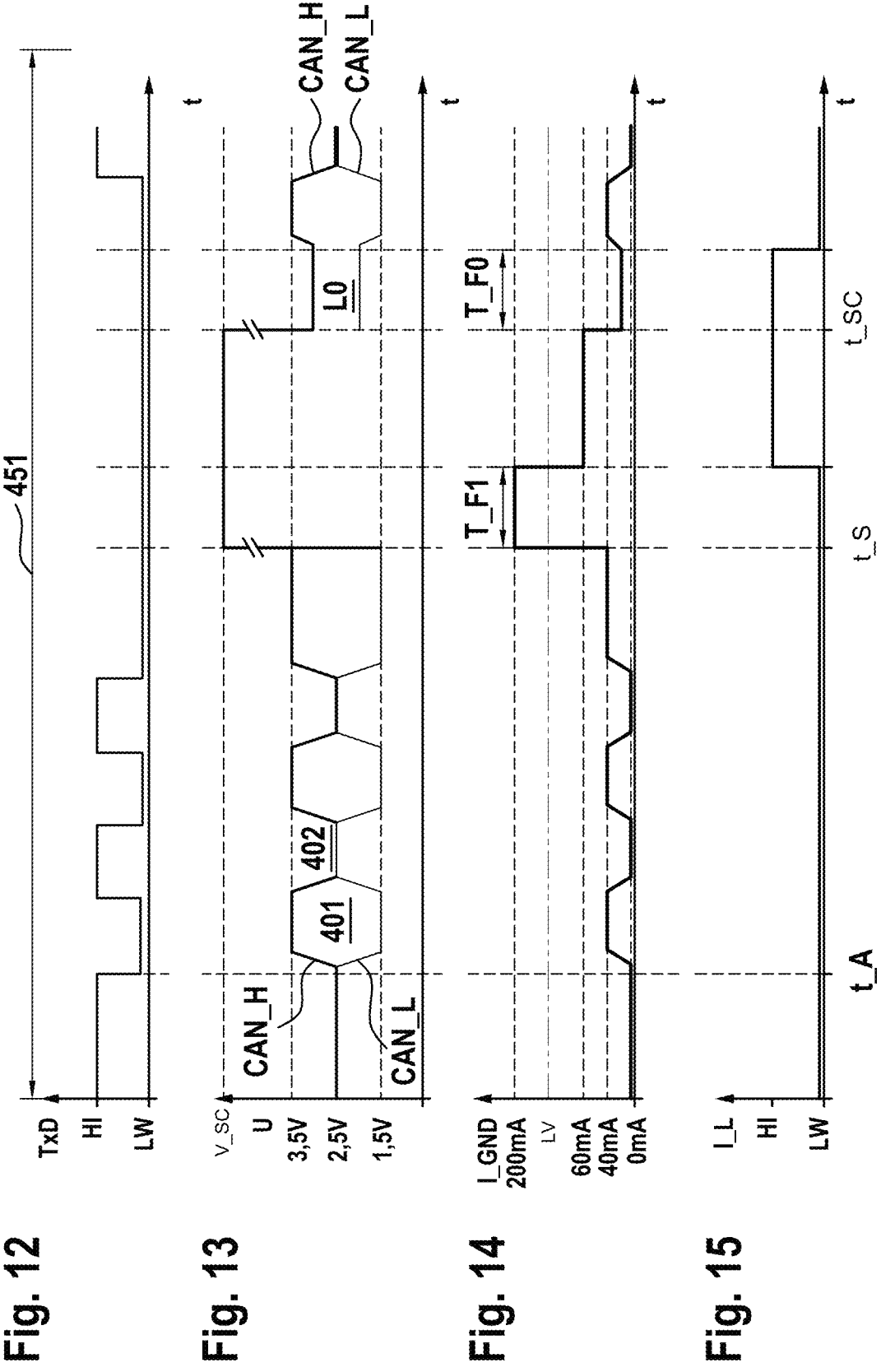
FIG. 12 shows an example of a time curve of a digital transmit signal in the arbitration phase, which transmit signal is to be converted into bus signals CAN_H, CAN_L for the bus of the bus system of FIG. 1.
FIG. 13 shows the time curve of the bus signals CAN_H, CAN_L which are transmitted onto the bus by the transmitting module of FIG. 9 due to the transmit signal of FIG. 12.
FIG. 14 shows the time curve of an electric current flowing to ground in a part of the current limiting circuit of FIG. 9 due to the signals of FIG. 12 and FIG. 13.
FIG. 15 shows the time curve of a current limiting signal which the current limiting circuit of FIG. 9 generates due to the signals of FIG. 12 to 14.

In principle, the current limiting circuit 1210 of FIG. 9, in particular its operating mode control block 1215, is designed such that each falling edge of the transmit signal TxD of FIG. 12 activates the current limiting circuit 1210 of FIG. 9. And the circuit 1210 is designed such that each rising edge of the transmit signal TxD of FIG. 12 results in the operating mode of the transmitting module 121 being changed to generate the recessive bus state 402. In the example of FIG. 12, the current limiting circuit 1210 of FIG. 9 can be activated in particular at time t_A. Activation can be accomplished by means of the operating mode control block 1215.

According to the signals of FIG. 12 to FIG. 15, the example is considered in which there is initially communication with the transmitting module 121 of FIG. 9 in the arbitration phase 451, as described above and as shown on the left side of FIG. 12 to FIG. 15. As a result, according to the states HI, LW of the transmit signal TxD of FIG. 12, the states dominant 401 or recessive 402 are generated with the voltage U on the bus 40, as described above and as shown in FIG. 13. As a result, as shown in FIG. 14, a ground current I_GND between 0 mA and 40 mA is established, which flows via the resistor 1212 into the terminal 44. In addition, the current limiting circuit 1210 generates a digital current limiting signal I_L with the value LW (low), as shown on the left side of FIG. 15.

However, at a time t_S in FIG. 12 to FIG. 15, a short circuit to a positive voltage of, for example, U_SC=18 V occurs. In particular, U_CAN_L=18 V.

As a result, the ground current I_GND increases abruptly to a value of 200 mA, as shown in FIG. 14. Because the value of the ground current I_GND thus exceeds the limit value LV of 115 mA set in the comparators 1213, 1214, the filter time period T_F1 begins to run. After the filter time period T_F1 has elapsed, the current limiting circuit 1210 changes its digital current limiting signal I_L from the previous value LW (low) to the value HI (high), as shown on the right side of FIG. 15.

As a result, the ground current I_GND in FIG. 14 is limited below the predefined limit value LV, which in the example of FIG. 14 has a value of 115 mA. This ensures that the requirements of the specification/standard CiA610-3 are met.

At a time t_SC in FIG. 12 to FIG. 15, the short circuit on the bus 40 is ended or eliminated. At this time, the digital current limiting signal I_L is still at the value HI (high), as shown on the right side of FIG. 15. Therefore, the operating mode control block 1215 controls the transmission stages 121A, 121B, 121C, 121D as described above, so that the voltages for CAN_H, CAN_L are generated in order to set or generate the bus state L0 on the bus 40.

As a result, the ground current I_GND is pulled to the value for the bus state L0. This ground current I_GND (L0) has a value of about 20 mA in the example of FIG. 14. This too ensures that the requirements of the specification/standard CiA610-3 are met. In addition, the filter time period T_F0 begins to run at the time t_SC in FIG. 12 to FIG. 15. After the filter time period T_F0 has elapsed, the current limiting circuit 1210 changes its digital current limiting signal I_L from the previous value HI (high) to the value LW (low), as shown on the right side of FIG. 15. Therefore, the operating mode control block 1215 controls the transmission stages 121A, 121B, 121C, 121D as described above, so that the voltages for CAN_H, CAN_L are generated in order to set or generate the dominant bus state 401 on the bus 40.

As a result, the ground current I_GND is pulled from the value for the bus state L0 to the value for the bus state 401. This ground current I_GND has a value of about 40 mA in the example of FIG. 14.

This ensures that the requirements of the specification/standard CiA610-3 are met.

The filter time periods T_F1, T_F0 generated with at least one of the aforementioned filters 1213A, 1214A or filters 1213C, 1214C or filter 1215C provide some inertia for the circuit 1210. As a result, the current limiting circuit 1210 has a high degree of robustness against interference voltages/currents, such as the short circuit considered above.

The following constraints play a role in the dimensioning of the filter time periods T_F1, T_F0 for the activation or changing of the values of the signal I_GND:

a) Common-mode interference occurs with significant amplitude starting at a coupling frequency of 1 MHz and could trigger a current exceedance or current limiting. From this criterion, it follows that t_filt_DPI>=1 ρs.

b) Pulse-type disturbances according to the international standard ISO7637 occur for less than 1 μs. From this, it follows that t_filt_pulse>=1 μs.

Setting the filter time period T_F1 to 1 ρs therefore means that, after the short-circuit condition is applied, no current limiting occurs for at least about 1 ρs. This does not pose a problem, as the specification only specifies a maximum static current limiting value of 115 mA. If the static current limit is exceeded for the time period T_F1, there is no problem or damage, neither thermally nor electrically, for the common mode choke (CMC) or for the integrated circuit of the transmitting-receiving device 12 (transceiver IC).

In this way, the current limiting circuit 1210 limits the current of the transmitting module 121 according to the upper limit of the specification/standard CiA610-3. This also applies to the arbitration phase 451, even though according to the CAN XL specification the state L0 is intended exclusively for communication in the data phase.

Thus, the operating mode control block 1215 uses the bus state L0 according to FIG. 8 or FIG. 13 also in the slow phase of the communication, the arbitration phase 451, to limit the short-circuit current through the resistor 1212.

Figure 16:
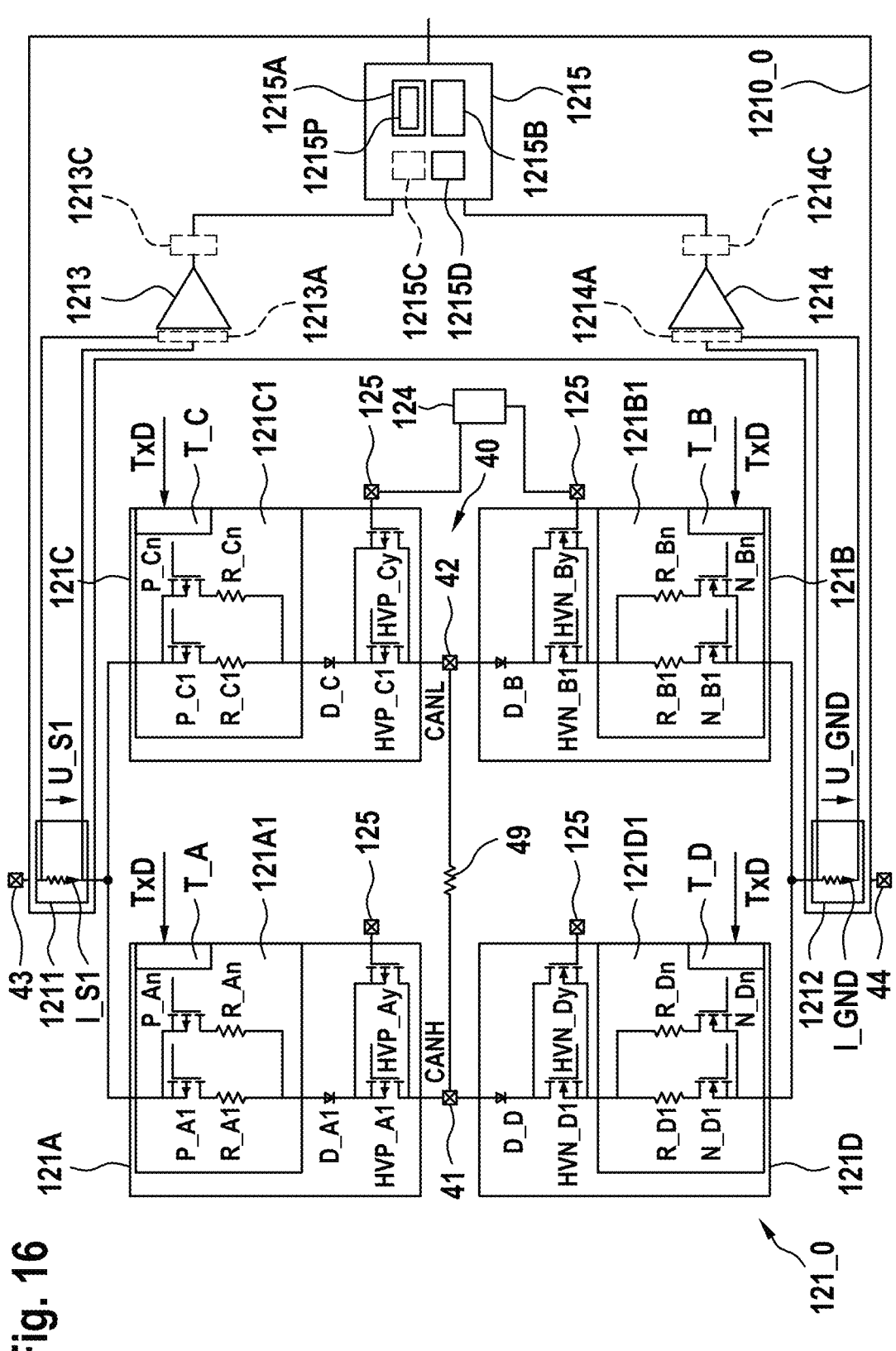
FIG. 16 shows a circuit diagram of a transmitting module with a current limiting circuit for a subscriber station of the bus system according to a second exemplary embodiment of the present invention.

FIG. 16 shows a transmitting module 121_0 with a current limiting circuit 1210_0 according to a second exemplary embodiment. The transmitting module 121_0 is constructed, in many parts, in the same way as the transmitting module 121 according to the first exemplary embodiment. Therefore, only the differences from the first exemplary embodiment are described below.

In contrast to the first exemplary embodiment, the current limiting circuit 1210_0 according to the present exemplary embodiment has an adjustment module 1215D. The adjustment module 1215D adjusts the time of the current limiting with a hold time. The hold time is stored as piece of information and/or parameter 1215P in the memory module 1215A.

Once the current limiting circuit 1210_0 has triggered the current limiting, the state L0 is controlled or activated for the transmitting module 121_0 and fixed for the hold time with the adjustment module 1215D, regardless of the output signal of the comparators 1213, 1214.

In this way, the interference emission of the transmitting module 121_0 can be reduced even further.

According to a third exemplary embodiment, the adjustment module 1215D is designed to carry out, in particular by means of a circuit, an additional current detection which, during the transmission state L0 of the transmitting module 121_0, checks whether the current I_GND has fallen below a predefined limit value. If the current I_GND has fallen below a predefined limit value, the adjustment module 1215D can cause the operating mode control block 1215 to switch the transmitting module 121_0 back to the dominant state 401, provided that the state 401 is still requested by the transmit signal TxD=LW. This also prevents the upper limit of the current limiting from being exceeded.

This also allows the interference emitted by the transmitting module 121_0 to be further reduced.

According to a fourth exemplary embodiment, the adjustment module 1215D is designed to detect transient disturbances. If such disturbances are detected, the above-described current limiting by the current limiting circuit 1210_0 is not activated, even if the comparators 1213, 1214 signal the activation. Instead, the adjustment module 1215D activates the current limiting only when overcurrent is present and no transient disturbances are detected.

This also allows the interference emitted by the transmitting module 121_0 to be further reduced.

According to a fifth exemplary embodiment, the adjustment module 1215D is designed such that, when a transmit signal TxD=LW is present and overcurrent is detected, the adjustment module prevents the operating mode control block 1215 from switching the transmitting module 121_0 to the state L0. Instead, the currently existing dominant state 401 of the transmitting module 121_0 is modified by increasing the impedance of the transmission stages 121A and 121B. This is done by gradually or abruptly disconnecting transistors of the parallel circuit P_A1 to_An and N_A1 to_An of the transmission stage 121A.

This also allows the interference emitted by the transmitting module 121_0 to be further reduced.

All above-described designs of the transmitting module 121, 121_0, of the current limiting circuits 1210, 1210_0, of the transmitting/receiving devices 12, 22, of the subscriber stations 10, 20, 30, of the bus system 1 and of the method carried out therein according to the first and second exemplary embodiment and their modifications or options can be used individually or in all possible combinations. Additionally, the following modifications are possible in particular.

In all described exemplary embodiments and their modifications or options, the transmitting module 121, 121_0 does not have to have any transmission stages 121A, 121B, 121C, 121D that form a full bridge with connected resistors. Instead, the transmitting module 121, 121_0 of any exemplary embodiment may have transmission stages that form a full bridge with connected currents, in particular current sources and/or current sinks.

The above-described bus system 1 according to the first and second exemplary embodiment is described on the basis of a bus system based on the CAN protocol. However, the bus system 1 according to the first and/or second exemplary embodiment may alternatively be another type of communication network in which the signals are transmitted as differential signals. It is advantageous, but not necessarily a prerequisite, for exclusive, collision-free access of a subscriber station 10, 20, 30 to the bus 40 to be ensured in the bus system 1, at least for certain time periods.

The bus system 1 according to the first and/or second exemplary embodiment and their modifications is in particular a CAN bus system or a CAN HS bus system or a CAN FD bus system or a CAN SIC bus system or a CAN XL bus system. However, the bus system 1 may be another communication network in which the signals are transmitted as differential signals and serially over the bus.

Thus, the functionality of the above-described exemplary embodiments can be used, for example, in transmitting/receiving devices 12, 22 that can be operated in a CAN bus system or a CAN HS bus system or a CAN FD bus system or a CAN SIC bus system or a CAN XL bus system.

It is possible that, for the two bus states 401, 402, at least temporarily, a dominant bus state and a recessive bus state are not used, but instead a first bus state and a second bus state which are both driven are used. An example of such a bus system is a CAN XL bus system.

The number and arrangement of the subscriber stations 10, 20, 30 in the bus system 1 according to the exemplary embodiments and their modifications is arbitrary. In particular, only subscriber stations 10 or only subscriber stations 30 are present in the bus systems 1 of the first or second exemplary embodiment.

What is claimed is:

1. A transmitting module for transmitting differential signals in a serial bus system, comprising:
   a first, a second, a third, and a fourth transmission stage which are connected in a full bridge, in which the first and fourth transmission stages are connected in series and the third and second transmission stages are connected in series; and
   a current limiting circuit configured to measure and evaluate currents through a first and a second bleeder resistor which are connected to the full bridge;
   wherein the first, second, third, and fourth transmission stages are configured to generate differential bus signals for a bus of the bus system in response to two different values of a digital transmit signal such that the transmitting module generates, in its first operating mode, a first or a second bus state on the bus, and generates, in its second operating mode, a third or fourth bus state, wherein bus signals on the bus form a differential voltage of which a voltage value is different for the first, second, third, and fourth bus states; and
   wherein the current limiting circuit is configured to limit current through the second bleeder resistor based on the evaluation of the currents by the current limiting circuit and according to a value of the digital transmit signal, an operating mode of the transmitting module, and a predefined limit value.

2. The transmitting module according to claim 1, wherein the current limiting circuit is configured to control, in the first operating mode of the transmitting module, the first, second, third, and fourth transmission stages to generate the third bus state when the evaluation of the currents through the first and/or second bleeder resistor shows that a value of at least one of the currents exceeds the predefined limit value.

3. The transmitting module according to claim 1, wherein the current limiting circuit is configured to control, in the first operating mode of the transmitting module, the first, second, third, and fourth transmission stages for modified generation of the first bus state when the evaluation of currents through the first and/or second bleeder resistor shows that a value of at least one of the currents exceeds the predefined limit value.

4. The transmitting module according to claim 1, wherein:
   the first bus state is a dominant bus state,
   the second bus state is a recessive bus state which can be overwritten by the dominant bus state,
   the current limiting circuit is configured such that each falling edge on the digital transmit signal activates the current limiting circuit, and
   the current limiting circuit is configured such that, at each rising edge on the digital transmit signal, the current limiting circuit switches the transmitting module to a transmission state for generating the recessive bus state on the bus.

5. The transmitting module according to claim 1, wherein:
   the current limiting circuit includes a filter having a filter time period, and the current limiting circuit is configured to control, in the first operating mode of the transmitting module, the first, second, third, and fourth transmission stages for current limiting only after the filter time period has elapsed.

6. The transmitting module according to claim 1, wherein:

the current limiting circuit includes a first and a second comparator, the first bleeder resistor is connected between a terminal for a bus voltage supply and the full bridge and is connected between inputs of the first comparator, and wherein the second bleeder resistor is connected between a terminal for ground and the full bridge and is connected between inputs of the second comparator.

7. The transmitting module according to claim 6, wherein the current limiting circuit includes an operating mode control block configured to evaluate the outputs of the first and second comparators.

8. The transmitting module according to claim 6, wherein the current limiting circuit also includes an adjustment module configured to adjust the current limiting according to at least one piece of information and/or one parameter, wherein the at least one piece of information and/or parameter includes:

a hold time for which the third bus state switched due to current limiting is to be fixed, regardless of an output signal of the first and second comparators, a current detection which, during the third bus state switched due to current limiting, indicates whether the current has fallen below a usual value for the third bus state, a detection of transient disturbances for which the current limiting circuit is not activated, regardless of the output signal of the first and second comparators.

9. The transmitting module according to claim 1, wherein the current limiting circuit is configured to generate a digital signal which indicates whether current limiting is active in which the first, second, third, and fourth transmission stages are to be controlled, in the first operating mode of the transmitting module, to generate the third bus state, or is not active.

10. The transmitting module according to claim 1, wherein output terminals of the full bridge are configured to connect to a terminating resistor of the bus.

11. The transmitting module according to claim 1, wherein:

in a first communication phase of a frame that is generated for a message to at least one other subscriber station of the bus system, the transmitting module is switched to the first operating mode, and in a second communication phase of the frame, the transmitting module is switched to the second operating mode or a third operating mode, and in the first communication phase, it is negotiated between subscriber stations of the bus system which subscriber station will receive exclusive access to the bus of the bus system in the second communication phase following the first communication phase.

12. The transmitting module according to claim 1, wherein:

the first transmission stage is configured to generate transmission currents for a first signal that is to be transmitted onto a bus of the bus system, the second transmission stage is configured to generate transmission currents for a second signal that is to be transmitted onto the bus as a signal that is differential to the first signal, the third transmission stage is configured to generate transmission currents for the first signal, and the fourth transmission stage is configured to generate transmission currents for the second signal.

13. The transmitting module according to claim 1, wherein:

each of the first, second, third, and fourth transmission stages includes at least two current stages connected in parallel with one another, each of the at least two current stages includes a switchable resistor, the switchable resistors of each of the first, second, third, and fourth transmission stages have different resistance values, a number n of the at least two current stages is the same for each of the first, second, third, and fourth transmission stages, n being a natural number greater than 1.

14. The transmitting module according to claim 13, wherein:

each of the at least two current stages includes a CMOS transistor for switching the resistor of the current stage, the CMOS transistor of the current stages of the first transmission stage is a PMOS transistor, the CMOS transistor of the current stages of the second transmission stage is an NMOS transistor, the CMOS transistor of the current stages of the third transmission stage is a PMOS transistor, and the CMOS transistor of the current stages of the fourth transmission stage is an NMOS transistor.

15. The transmitting module according to claim 1, wherein each of the first, second, third, and fourth transmission stages includes:

a polarity reversal diode for protection against positive feedback into a terminal for the bus voltage supply and negative feedback from a terminal for ground, and at least one cascode for protecting the CMOS transistors, wherein at least two cascodes are connected in parallel with one another, wherein a number y of the cascodes is the same for each of the first, second, third, and fourth transmission stages, y being a natural number greater than 1, and wherein an on-resistance of the at least two cascodes is different.

16. The transmitting module according to claim 13, further comprising:

a control circuit configured to control switchable components of the first, second, third, and fourth transmission stages according to a digital transmit signal and according to an operating mode set for the transmitting module, wherein the control circuit is configured for temporally staggered and controlled switching of the resistance values of the at least two current stages.

17. A transmitting/receiving device for a subscriber station for a serial bus system, comprising:

a transmitting module for transmitting differential signals in a serial bus system, including:

a first, a second, a third, and a fourth transmission stage which are connected in a full bridge, in which the first and fourth transmission stages are connected in series and the third and second transmission stages are connected in series, and a current limiting circuit configured to measure and evaluate currents through a first and a second bleeder resistor which are connected to the full bridge, wherein the first, second, third, and fourth transmission stages are configured to generate differential bus signals for a bus of the bus system in response to two different values of a digital transmit signal such that the transmitting module generates, in its first operating mode, a first or a second bus state on the bus, and generates, in its second operating mode, a third or fourth bus state, wherein bus signals on the bus form a differential voltage of which a voltage value is different for the first, second, third, and fourth bus states, and wherein the current limiting circuit is configured to limit current through the second bleeder resistor based on the evaluation of the currents by the current limiting circuit and according to a value of the digital transmit signal, an operating mode of the transmitting module, and a predefined limit value; and a receiving module configured to receive signals from the bus.

18. A subscriber station for a serial bus system, comprising:

a transmitting/receiving device, including:

a transmitting module for transmitting differential signals in a serial bus system, including:

a first, a second, a third, and a fourth transmission stage which are connected in a full bridge, in which the first and fourth transmission stages are connected in series and the third and second transmission stages are connected in series, and a current limiting circuit configured to measure and evaluate currents through a first and a second bleeder resistor which are connected to the full bridge, wherein the first, second, third, and fourth transmission stages are configured to generate differential bus signals for a bus of the bus system in response to two different values of a digital transmit signal such that the transmitting module generates, in its first operating mode, a first or a second bus state on the bus, and generates, in its second operating mode, a third or fourth bus state, wherein bus signals on the bus form a differential voltage of which a voltage value is different for the first, second, third, and fourth bus states, and wherein the current limiting circuit is configured to limit current through the second bleeder resistor based on the evaluation of the currents by the current limiting circuit and according to a value of the digital transmit signal, an operating mode of the transmitting module, and a predefined limit value, and a receiving module configured to receive signals from the bus; and a communication control device configured to control communication in the bus system and to generate a digital transmit signal for controlling the first, second, third, and fourth transmission stages.

19. A method for transmitting differential signals in a serial bus system, wherein the method is carried out with a transmitting module which has a current limiting circuit and which has a first, second, third, and fourth transmission stage connected in a full bridge, and wherein the method comprises the following steps:

measuring and evaluating, using the current limiting circuit, currents through a first and a second bleeder resistor which are connected to the full bridge, in which the first and fourth transmission stages are connected in series and the third and second transmission stages are connected in series; and generating, using the first, second, third, and fourth transmission stages, differential bus signals for a bus of the bus system in response to the two different values of a digital transmit signal such that the transmitting module generates, in its first operating mode, a first or second bus state on the bus, and generates, in its second operating mode, a third or fourth bus state;

wherein bus signals on the bus form a differential voltage of which a voltage value is different for the first, second, third, and fourth bus states; and wherein the current limiting circuit limits, in the first operating mode of the transmitting module, current through the second bleeder resistor based on the evaluation of the currents by the current limiting circuit and according to a value of the digital transmit signal, the operating mode of the transmitting module, and a predefined limit value.

* * * * *